(12) United States Patent
Harada et al.

(10) Patent No.: US 8,085,251 B2
(45) Date of Patent: Dec. 27, 2011

(54) DISPLAY-AND-IMAGE-PICKUP APPARATUS, OBJECT DETECTION PROGRAM AND METHOD OF DETECTING AN OBJECT

(75) Inventors: Tsutomu Harada, Kanagawa (JP);
Shinya Hashimoto, Kanagawa (JP);
Kazunori Yamaguchi, Kanagawa (JP);
Mitsuru Tateuchi, Kanagawa (JP);
Ryoichi Tsuzaki, Kanagawa (JP);
Chiaki Kon, Kanagawa (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 12/289,042

(22) Filed: Oct. 20, 2008

(65) Prior Publication Data

US 2009/0123029 A1    May 14, 2009

(30) Foreign Application Priority Data

Nov. 9, 2007    (JP) ................................ 2007-291767

(51) Int. Cl.
*G06F 3/041* (2006.01)
(52) U.S. Cl. ........................................ 345/173; 382/124
(58) Field of Classification Search .................... 345/173
See application file for complete search history.

(56) References Cited

U.S. PATENT DOCUMENTS

| 7,113,174 | B1 * | 9/2006 | Takekawa et al. | 345/173 |
| 7,822,236 | B2 * | 10/2010 | Fenrich et al. | 382/124 |
| 2005/0169506 | A1 * | 8/2005 | Fenrich et al. | 382/127 |
| 2007/0109239 | A1 * | 5/2007 | den Boer et al. | 345/87 |
| 2008/0165116 | A1 * | 7/2008 | Herz et al. | 345/102 |
| 2010/0289886 | A1 * | 11/2010 | Fenrich et al. | 348/77 |

FOREIGN PATENT DOCUMENTS

JP    2004-127272    4/2004

* cited by examiner

*Primary Examiner* — Sath V Perungavoor
(74) *Attorney, Agent, or Firm* — Rader Fishman & Grauer PLLC

(57) ABSTRACT

A display-and-image-pickup apparatus includes: a display-and-image-pickup panel having an image display function and an image pickup function; an image producing means for producing a predetermined processed image on the basis of a picked-up image of a proximity object obtained through the use of the display-and-image-pickup panel; an image processing means for obtaining information about the proximity object through selectively using one of two obtaining modes on the basis of at least one of the picked-up image and the processed image; and a switching means for switching processes so that, in the case where the parameter is increasing, one of the two obtaining modes is switched to the other obtaining mode when the parameter reaches a threshold value, and in the case where the parameter is decreasing, the other obtaining mode is switched to the one obtaining mode when the parameter reaches a smaller threshold value.

19 Claims, 35 Drawing Sheets

|  | DIFFERENTIAL IMAGE FINGERTIP EXTRACTION PROCESS | SHADOW IMAGE FINGERTIP EXTRACTION PROCESS |
|---|---|---|
| ENVIRONMENTAL CHANGE | ○ | △ (OPERATE AT CERTAIN OR HIGHER BRIGHTNESS) |
| BACKLIGHT OFF (UNDER SUNLIGHT) | × | ○ |
| DEGREE OF DISPLAY FREEDOM | △ (PREVENT BY COLOR SPECIFICATIONS) | ○ |
| BLACK GLOVE | × | ○ (BRIGHT ENVIRONMENT) |
| 50Hz FLUORESCENT LIGHT | △ (OK WHEN IT IS DARK) | △ (OK WHEN IT IS BRIGHT) |
| SPOTLIGHT | ○ | △ (DEPENDING ON SURROUNDING BRIGHTNESS) |
| SUNBEAMS THROUGH FOLIAGE | △ (WEAK ON MOVEMENT. DEPENDING ON INTENSITY) | ○ (OK WHEN SUNBEAMS ARE NOT SHARP) |
| STYLUS | △ (REFLECTION BALLPOINT PEN, DISPLAY COLOR SPECIFIED) | △ (DETECTION ALGORITHM IS NECESSARY) |

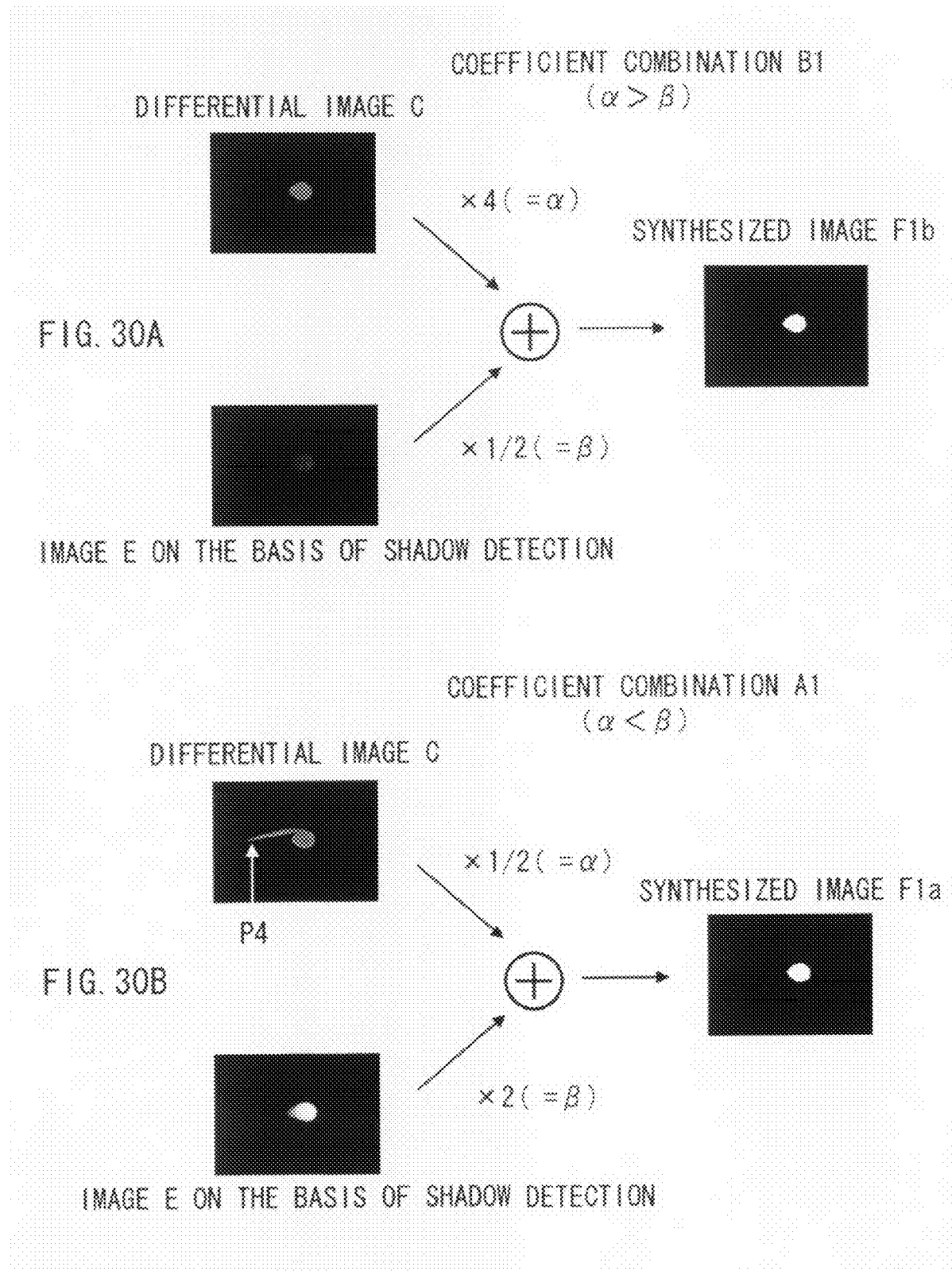

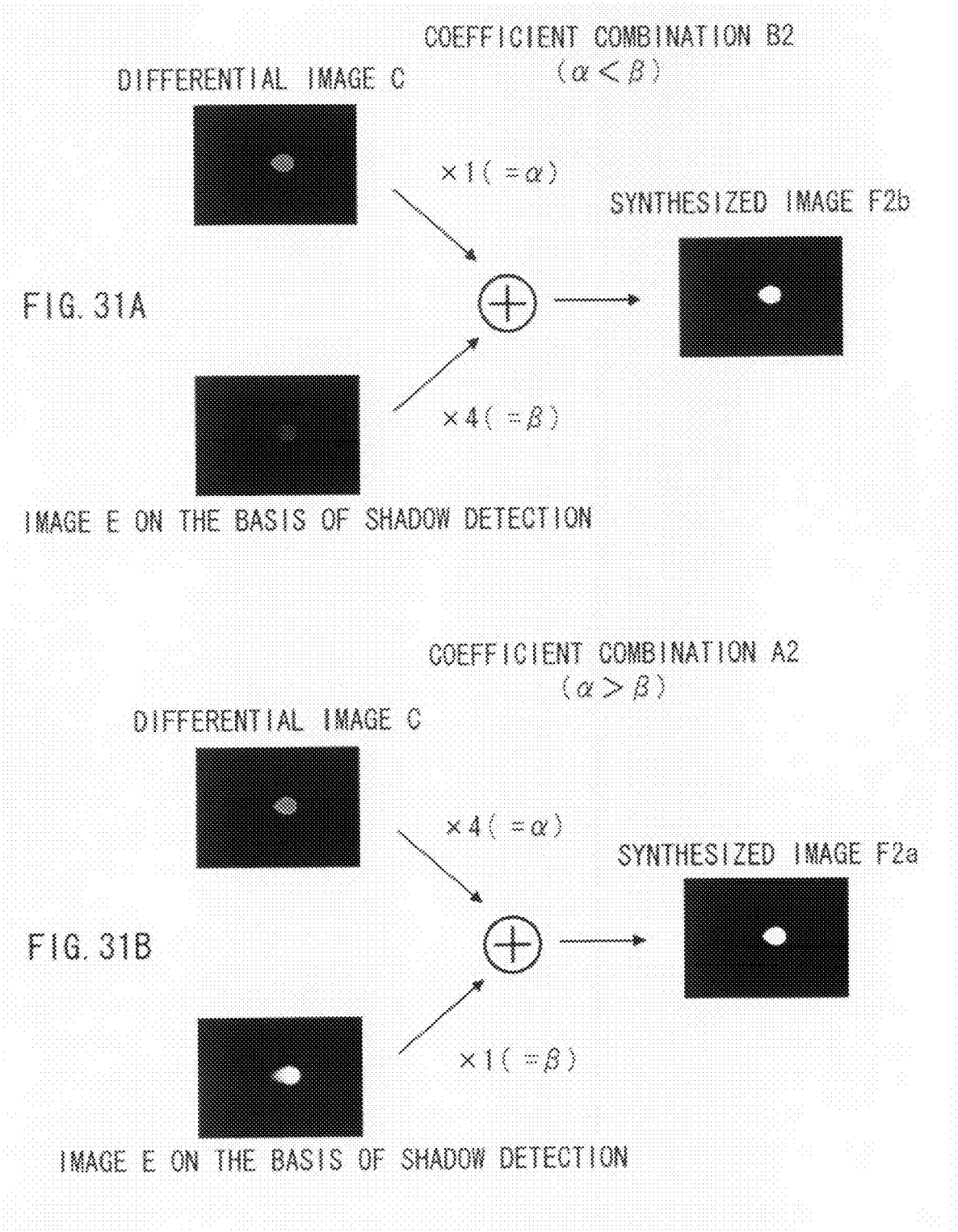

DISPLAY-AND-IMAGE-PICKUP APPARATUS, OBJECT DETECTION PROGRAM AND METHOD OF DETECTING AN OBJECT

CROSS REFERENCES TO RELATED APPLICATIONS

The present invention contains subject matter related to Japanese Patent Application JP 2007-291767 filed in the Japanese Patent Office on Nov. 9, 2007, the entire contents of which being incorporated herein by reference.

BACKGROUND OF THE INVENTION

1. Field of the Invention

The present invention relates to a display-and-image pickup apparatus obtaining information such as the position of an object touching or in proximity to a panel, and an object detection program and a method of detecting an object for obtaining such information.

2. Description of the Related Art

Techniques of detecting the position or the like of an object touching or in proximity to a surface of a display have been heretofore known. Among them, as a typical and widespread technique, a display including a touch panel is cited.

There are various types of touch panels, but as a commonly used type, a touch panel of a type detecting capacitance is cited. When a finger touches the touch panel of this kind, the touch panel captures a change in a surface charge of the panel to detect the position or the like of an object. Therefore, when such a touch panel is used, users can intuitively operate the touch panel.

Moreover, the applicant of the invention has proposed a display including a display section (a display-and-image-pickup panel) which has a display function of displaying an image and an image pickup function (detection function) of picking up an image of an object (detecting an object) in Japanese Unexamined Patent Application Publication No. 2004-127272.

SUMMARY OF THE INVENTION

When a display described in Japanese Unexamined Patent Application Publication No. 2004-127272 is used, for example, in the case where an object such as a finger touches or comes in proximity to a display-and-image-pickup panel, the position or the like of the object can be detected on the basis of an image picked up by utilizing display light reflected by the object. Therefore, when this display is used, the position or the like of the object is detectable with a simple configuration without separately arranging a component such as a touch panel on a display-and-image-pickup panel.

However, for example, in the case where display light reflected by the object is used as described above, the luminance of the display light is an issue. More specifically, the luminance of received light depends on the luminance of display light, and the luminance of the display light changes according to image data, so, for example, in the case of a so-called black display state, in the case where a backlight is constantly in an off state (for example, in the case where a display is used in the open air) in a semi-transmissive liquid crystal display, or the like, it is difficult to detect the position or the like of an object on the basis of a picked-up image.

Therefore, it is considered that, for example, when switching between an image pickup mode and a detection mode or the like is performed according to use conditions, a mode suitable for use conditions is usable, and the position or the like of an object touching or in proximity to a panel is reliably detectable.

However, in the case where switching between modes is performed according to the magnitude of some parameter, for example, when the parameter fluctuates around a threshold value for switching, switching between the image pickup mode and the detection mode is frequently performed, so an operation of detecting the position or the like of an object becomes unstable.

In view of the foregoing, it is desirable to provide an image display capable of stably detecting an object irrespective of use conditions, and a method of detecting an object.

According to an embodiment of the invention, there is provided a display-and-image-pickup apparatus including: a display-and-image-pickup panel having an image display function and an image pickup function; an image producing means for producing a predetermined processed image on the basis of a picked-up image of a proximity object obtained through the use of the display-and-image-pickup panel; an image processing means for obtaining information about at least one of position, shape and size of the proximity object through selectively using one of two obtaining modes on the basis of at least one of the picked-up image and the processed image; and a switching means. In the switching means, a switching process between the two obtaining modes in the image processing means is performed on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value. In addition, "a proximity object" means not only a literally proximity object but also an object in a touch state.

According to an embodiment of the invention, there is provided an object detection program causing a computer to execute: an image pickup step of obtaining a picked-up image of a proximity object through the use of a display-and-image-pickup panel having an image display function and an image pickup function; an image producing step of producing a predetermined processed image on the basis of the picked-up image obtained in the image pickup step; a detecting step of detecting information about at least one of position, shape and size of the proximity object through selectively using one of two obtaining modes on the basis of at least one of the picked-up image obtained in the image pickup step and the processed image obtained in the image producing step; and a switching step. In the switching step, a switching process between the two obtaining modes used in the detecting step is performed on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value.

According to an embodiment of the invention, there is provided a method of detecting an object including the steps of: obtaining a picked-up image of a proximity object through the use of a display-and-image-pickup panel having an image display function and an image pickup function; producing a predetermined processed image on the basis of the picked-up image; detecting information about at least one of position, shape and size of the proximity object through selectively using one of two obtaining modes on the basis of at least one of the picked-up image and the processed image; and performing a switching process between the two obtaining modes on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value.

In the display-and-image-pickup apparatus, the object detection program and the method of detecting an object according to the embodiment of the invention, the picked-up image of the proximity object is obtained through the use of the display-and-image-pickup panel having a image display function and an image pickup function, and a predetermined processed image is produced on the basis of the picked-up image. Then, information about at least one of position, shape and size of the proximity object is detected through selectively using one of two obtaining modes on the basis of at least one of the picked-up image and the processed image. Moreover, a switching process between the two obtaining modes is performed on the basis of the magnitude of a predetermined parameter. In this case, in the case where the parameter is increasing, one of the two obtaining modes is switched to the other obtaining mode when the parameter reaches the first threshold value, and in the case where the parameter is decreasing, the other obtaining mode is switched to the one obtaining mode when the parameter reaches the second threshold value smaller than the first threshold value. In other words, a switching process between the two obtaining modes is performed through the use of hysteresis. Thereby, for example, even in the case where the parameter fluctuates around the first threshold value or the second threshold value, a switching process between the two obtaining modes is prevented from being performed with each fluctuation of the parameter, and switching between obtaining modes with a high frequency is prevented.

In the display-and-image-pickup apparatus according to the embodiment of the invention, the picked-up image may be a shadow image obtained by picking up an image of a shadow of the proximity object with the display-and-image-pickup panel, and the processed image may be a differential image obtained by performing a differential process between a display-light-utilized image and the shadow image, the display-light-utilized image being obtained by picking up an image of the proximity object with the display-and-image-pickup panel through the use of display light from the display-and-image-pickup panel. In addition, "a shadow image" is an image obtained by picking up an image of a shadow by external light, and means an image obtained without utilizing display light.

In the display-and-image-pickup apparatus, the object detection program or the method of detecting an object according to the embodiment of the invention, a switching process between the two obtaining modes is performed on the basis of the magnitude of a predetermined parameter, and in the case where the parameter is increasing, one of the two obtaining modes is switched to the other mode when the parameter reaches the first threshold value, and in the case where the parameter is decreasing, the other obtaining mode is switched to the one obtaining mode when the parameter reaches the second threshold value smaller than the first threshold value; therefore, for example, even in the case where the parameter fluctuates around the first threshold value or the second threshold value, switching between the obtaining modes with a high frequency is prevented. Therefore, irrespective of use conditions, an object is stably detectable.

Other and further objects, features and advantages of the invention will appear more fully from the following description.

BRIEF DESCRIPTION OF THE DRAWINGS

FIG. 22 is an illustration for describing a comparison between the differential image fingertip extraction process and the shadow image fingertip extraction process;

FIGS. 30A and 30B are photographic views showing an example of coefficient combinations;

FIGS. 31A and 31B are photographic views showing another example of coefficient combinations;

DETAILED DESCRIPTION OF THE PREFERRED EMBODIMENTS

Preferred embodiments will be described in detail below referring to the accompanying drawings.

First Embodiment

Figure 1:
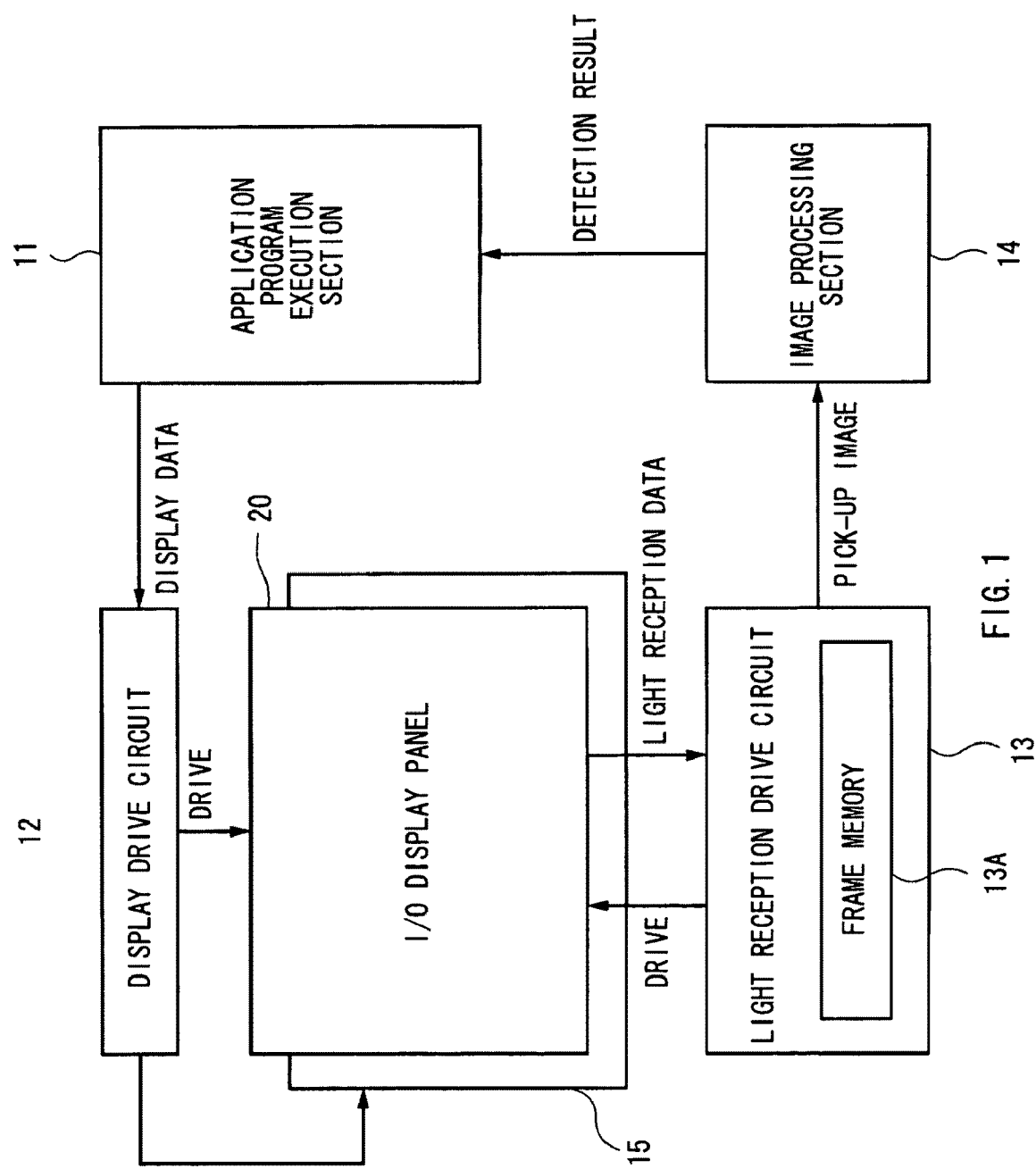
FIG. 1 is a block diagram showing the configuration of a display-and-image-pickup apparatus according to a first embodiment of the invention.

FIG. 1 shows the whole configuration of a display-and-image-pickup apparatus according to a first embodiment of the invention. The display-and-image-pickup apparatus includes an I/O display panel 20, a backlight 15, a display drive circuit 12, a light reception drive circuit 13, an image processing section 14 and an application program execution section 11.

The I/O display panel 20 is configured of a liquid crystal panel (an LCD (Liquid Crystal Display)) in which a plurality of pixels are arranged in a matrix form on the whole surface thereof, and has a function (a display function) of displaying an image such as a predetermined symbol or character on the basis of display data while performing a line-sequential operation, and a function (an image pickup function) of picking up an image of an object touching or in proximity to the I/O display panel 20, as will be described later. Moreover, the backlight 15 is a light source of the I/O display panel 20, and is formed, for example, by arranging a plurality of light-emitting diodes, and as will be described later, the backlight 15 performs an on-off operation at high speed at a predetermined timing in synchronization with an operation timing of the I/O display panel 20.

The display drive circuit 12 is a circuit driving the I/O display panel 20 (driving a line-sequential operation) so as to display an image on the I/O display panel 20 on the basis of display data (to perform a display operation).

The light reception drive circuit 13 is a circuit driving the I/O display panel 20 (driving a line-sequential operation) so as to obtain light reception data in the I/O display panel 20 (to pick up an image of an object). Light reception data in each pixel is stored in a frame memory 13A, for example, on a frame-by-frame basis to be outputted to the image processing section 14 as a picked-up image.

The image processing section 14 performs predetermined image processing (arithmetic processing) on the basis of the picked-up image outputted from the light reception drive circuit 13, and detects and obtains information about an object touching or in proximity to the I/O display 20 (position coordinate data, data about the shape or size of the object, or the like). A process of detecting the information will be described in detail later.

The application program execution section 11 executes a process according to predetermined application software on the basis of a detection result by the image processing section 14, and as the application program execution section 11, for example, a section allowing the position coordinates of a detected object to be included in display data, and be displayed on the I/O display panel 20, or the like is cited. Display data produced in the application program execution section 11 is supplied to the display drive circuit 12.

Figure 2:
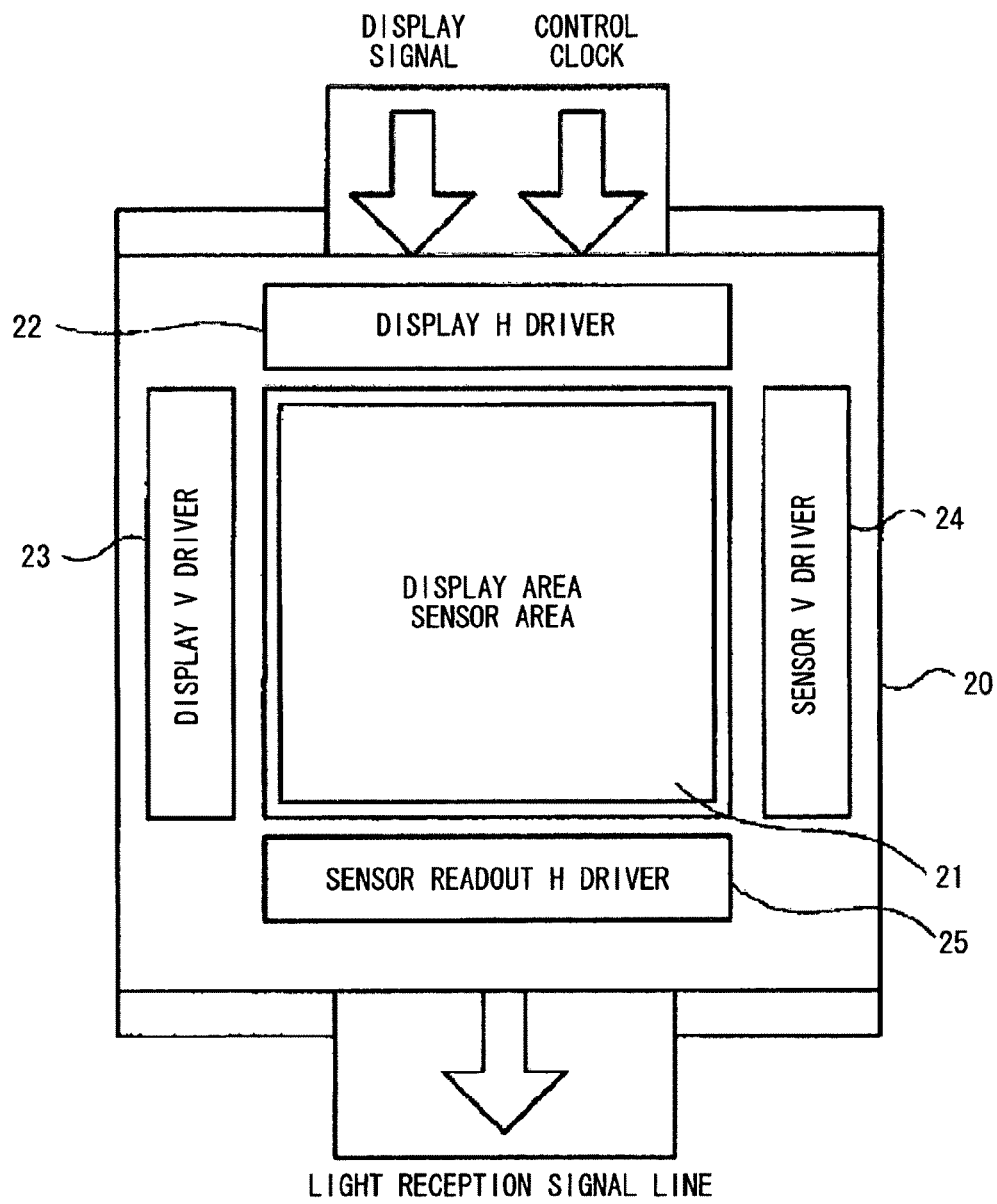
FIG. 2 is a block diagram showing a configuration example of an I/O display panel shown in FIG. 1.

Next, a specific configuration example of the I/O display panel 20 will be described below referring to FIG. 2. The I/O display panel 20 includes a display area (sensor area) 21, a display H driver 22, a display V driver 23, a sensor readout H driver 25 and a sensor V driver 24.

The display area (sensor area) 21 is a region where light from the backlight 15 is modulated to be emitted as display light, and an image of an object touching or in proximity to the area is picked up, and in the display area 21, liquid crystal devices which are light-emitting devices (display devices) and light-receiving devices (image pickup devices) which will be described later are arranged in a matrix form.

The display H driver 22, together with the display V driver 23, line-sequentially drives a liquid crystal device of each pixel in the display area 21 on the basis of a display signal for display drive and a control clock which are supplied from the display drive circuit 12.

The sensor readout H driver 25, together with the sensor V driver 24, line-sequentially drives a light-receiving device of each pixel in the display area 21 to obtain a light reception signal.

Figure 3:
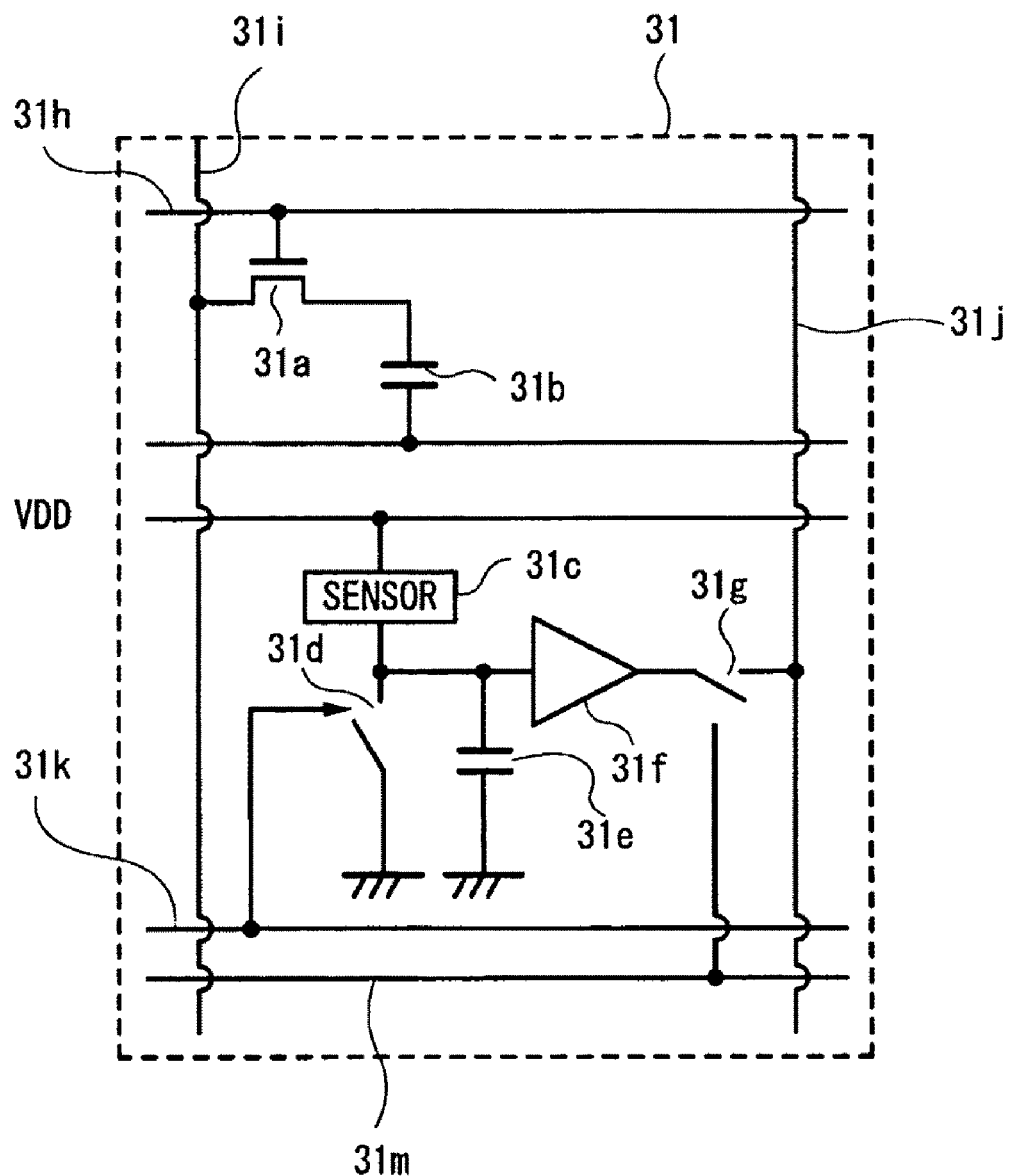
FIG. 3 is a circuit diagram showing a configuration example of each pixel.

Next, referring to FIG. 3, a specific configuration example of each pixel in the display area 21 will be described below. A pixel 31 shown in FIG. 3 includes a liquid crystal device which is a display device and a light-receiving device.

More specifically, a switching device 31a configured of a thin film transistor (TFT) or the like is arranged at an intersection of a gate electrode 31h extending in a horizontal direction and a drain electrode 31i extending in a vertical direction on the display device side, and a pixel electrode 31b including a liquid crystal is arranged between the switching device 31a and a facing electrode. Then, the switching device 31a performs an on-off operation on the basis of a drive signal supplied through the gate electrode 31h, and in an on state, a pixel voltage is applied to the pixel electrode 31b on the basis of a display signal supplied through the drain electrode 31i to set a display state.

On the other hand, on the light-receiving device side adjacent to the display device, for example, a light reception sensor 31c configured of, for example, a photodiode or the like is arranged, and a power source voltage VDD is supplied to the light reception sensor 31c. Moreover, a reset switch 31d and a capacitor 31e are connected to the light reception sensor 31c, and while the light reception sensor 31c is reset by the reset switch 31d, a charge corresponding to a light reception amount is accumulated in the capacitor 31e. Then, the accumulated charge is supplied to a signal output electrode 31j through a buffer amplifier 31f at a timing when a readout switch 31g is turned on, and then the accumulated charge is outputted to outside. Moreover, the on-off operation of the reset switch 31d is controlled by a signal supplied from a reset electrode 31k, and the on-off operation of the readout switch 31g is controlled by a signal supplied from a readout control electrode 31k.

Figure 4:
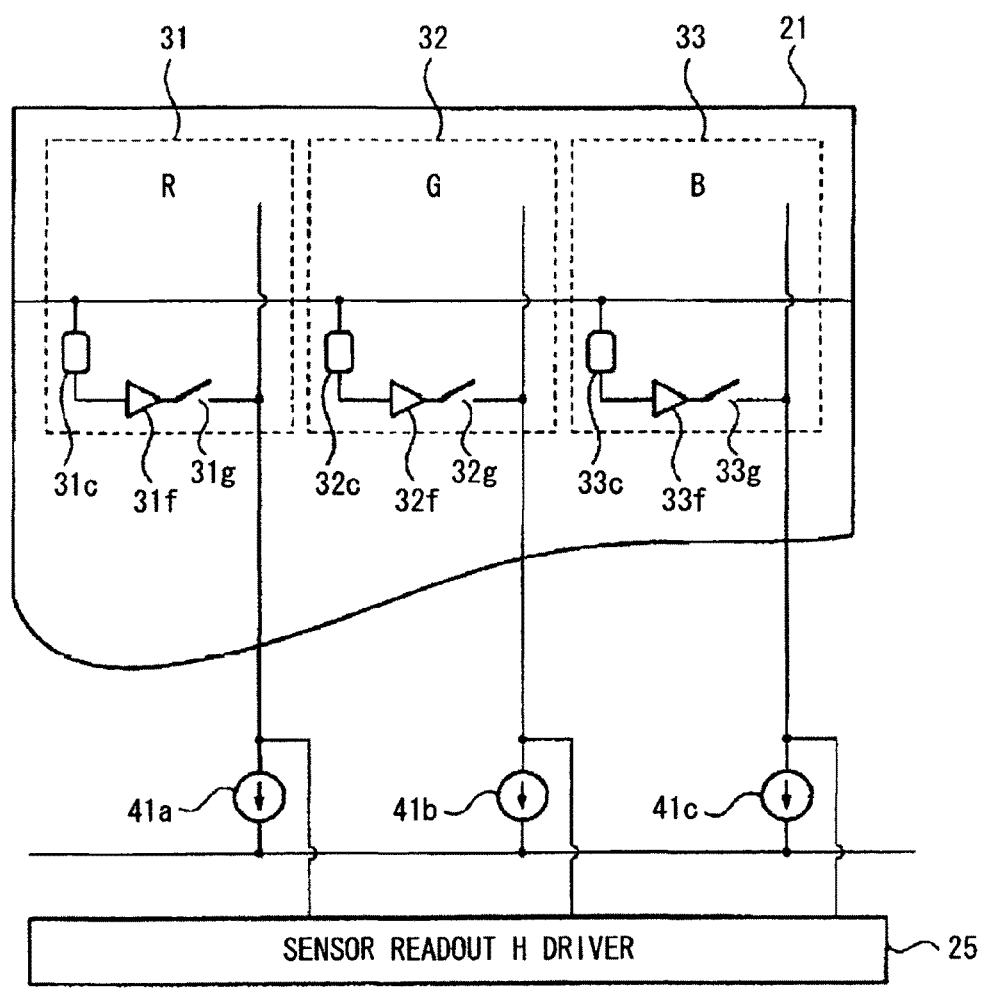
FIG. 4 is a circuit diagram for describing a connection relationship between each pixel and a sensor readout H driver.

Next, referring to FIG. 4, a connection relationship between each pixel in the display area 21 and the sensor readout H driver 25 will be described below. In the display area 21, a red (R) pixel 31, a green (G) pixel 32 and a blue (B) pixel 33 are arranged in order.

A charge accumulated in a capacitor connected to each of light reception sensors 31c, 32c and 33c of the pixels is amplified by each of buffer amplifiers 31f, 32f and 33f to be supplied to the sensor readout H driver 25 through each of signal output electrodes at a timing when each of readout switches 31g, 32g or 33g is turned on. Moreover, each of constant current sources 41a, 41b and 41c is connected to each of the signal output electrodes so that a signal corresponding to a light reception amount is detected in the sensor readout H driver 25 with high sensitivity.

Next, operations of the display-and-image-pickup apparatus according to the embodiment will be described in detail below.

At first, a basic operation of the display-and-image-pickup apparatus, that is, an operation of displaying an image and an operation of picking up an image of an object will be described below.

In the display-and-image-pickup apparatus, a display drive signal is produced in the display drive circuit 12 on the basis of display data supplied from the application program execution section 11, and line-sequential display drive is performed on the I/O display panel 20 by the drive signal to display an image. Moreover, at this time, the backlight 15 is driven by the display drive circuit 12 to perform a lighting-on/off operation in synchronization with the I/O display panel 20.

Figure 5:
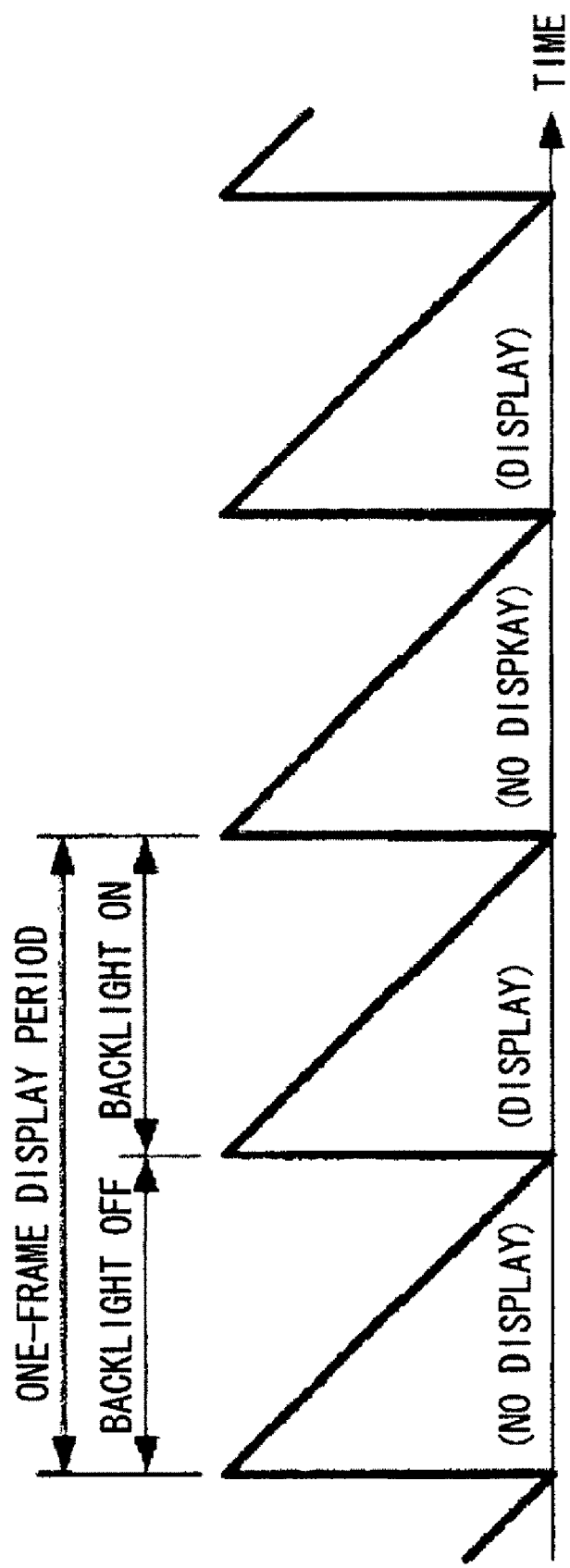
FIG. 5 is a timing chart for describing a relationship between an on-off state of a backlight and a display state.

Here, referring to FIG. 5, a relationship between the on-off state of the backlight 15 and the display state of the I/O display panel 20 will be described below.

At first, for example, in the case where an image is displayed in a frame period of 1/60 seconds, the backlight 15 is turned off (turned into an off state) in the first half of each frame period (during 1/120 seconds), and display is not performed. On the other hand, in the second half of each frame period, the backlight 15 is turned on (turned into an on state), and a display signal is supplied to each pixel to display an image in the frame period.

Thus, while the first half of each frame period is a non-lighting period in which display light is not emitted from the I/O display panel 20, the second half of each frame period is a lighting period in which display light is emitted from the I/O display panel 20.

In the case where there is an object (for example, a fingertip or the like) touching or in proximity to the I/O display panel 20, an image of the object is picked up by the light-receiving device of each pixel in the I/O display panel 20 by line-sequential light reception drive by the light reception drive circuit 13, and a light reception signal from each light-receiving device is supplied to the light reception drive circuit 13. In the light reception drive circuit 13, the light reception signals of pixels for 1 frame are stored and are outputted to the image processing section 14 as a picked-up image.

Then, in the image processing section 14, predetermined image processing (arithmetic processing) which will be described later is performed on the basis of the picked-up image, thereby information about the object touching or in proximity to the I/O display panel 20 (position coordinate data, data about the shape or size of the object, or the like) is detected.

Figure 6:
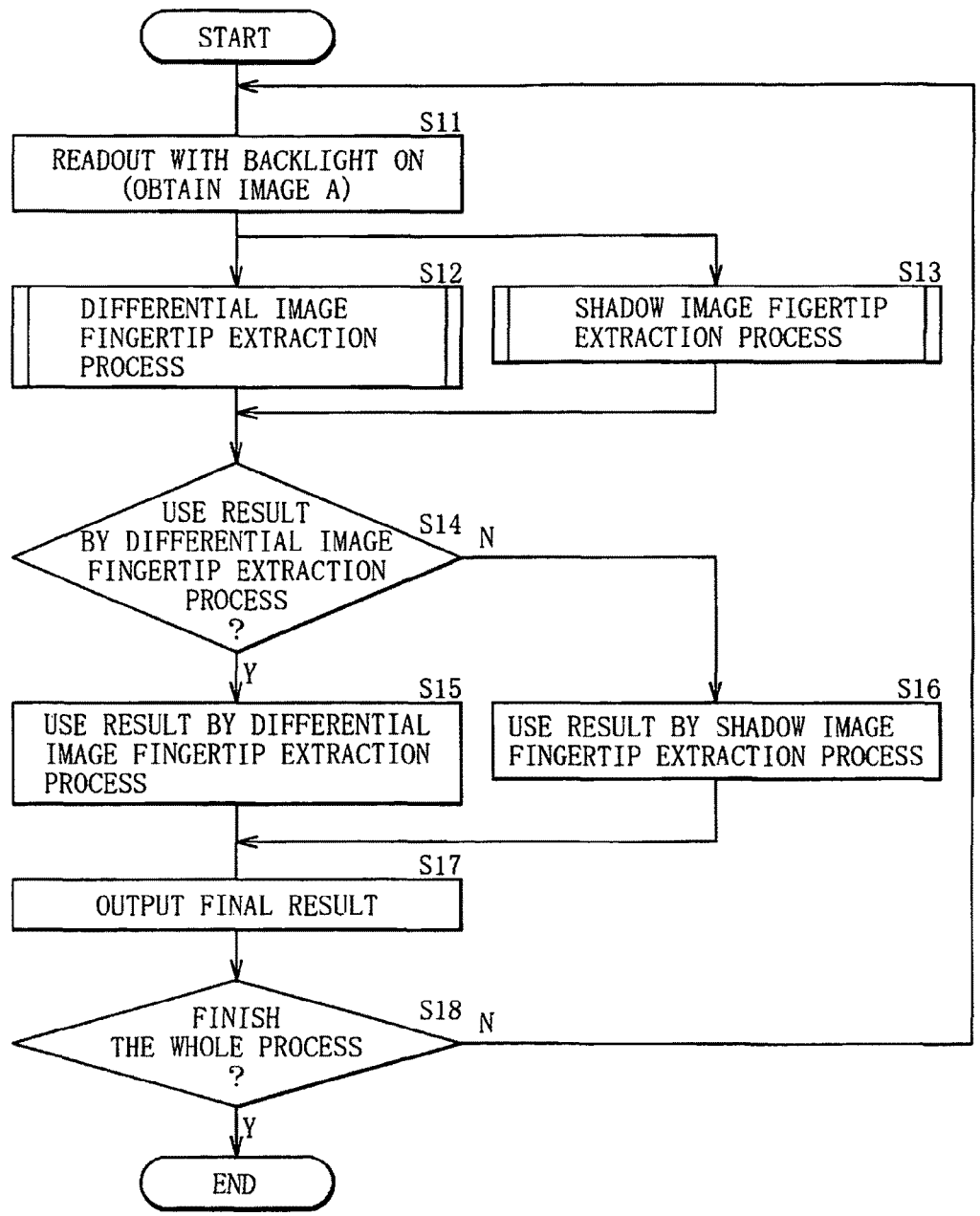
FIG. 6 is a flow chart showing a fingertip extraction process according to the first embodiment.

Next, referring to FIGS. 6 to 22, as one of characteristic parts of the invention, a process (a fingertip extraction process) of extracting an object (a proximity object) touching or in proximity to the I/O display panel 20 such as a fingertip by the image processing section 14 will be described in detail below. FIG. 6 shows a flow chart of the fingertip extraction process by the image processing section 14, and FIG. 7 shows a timing chart of a part of the fingertip extraction process.

Figure 7:
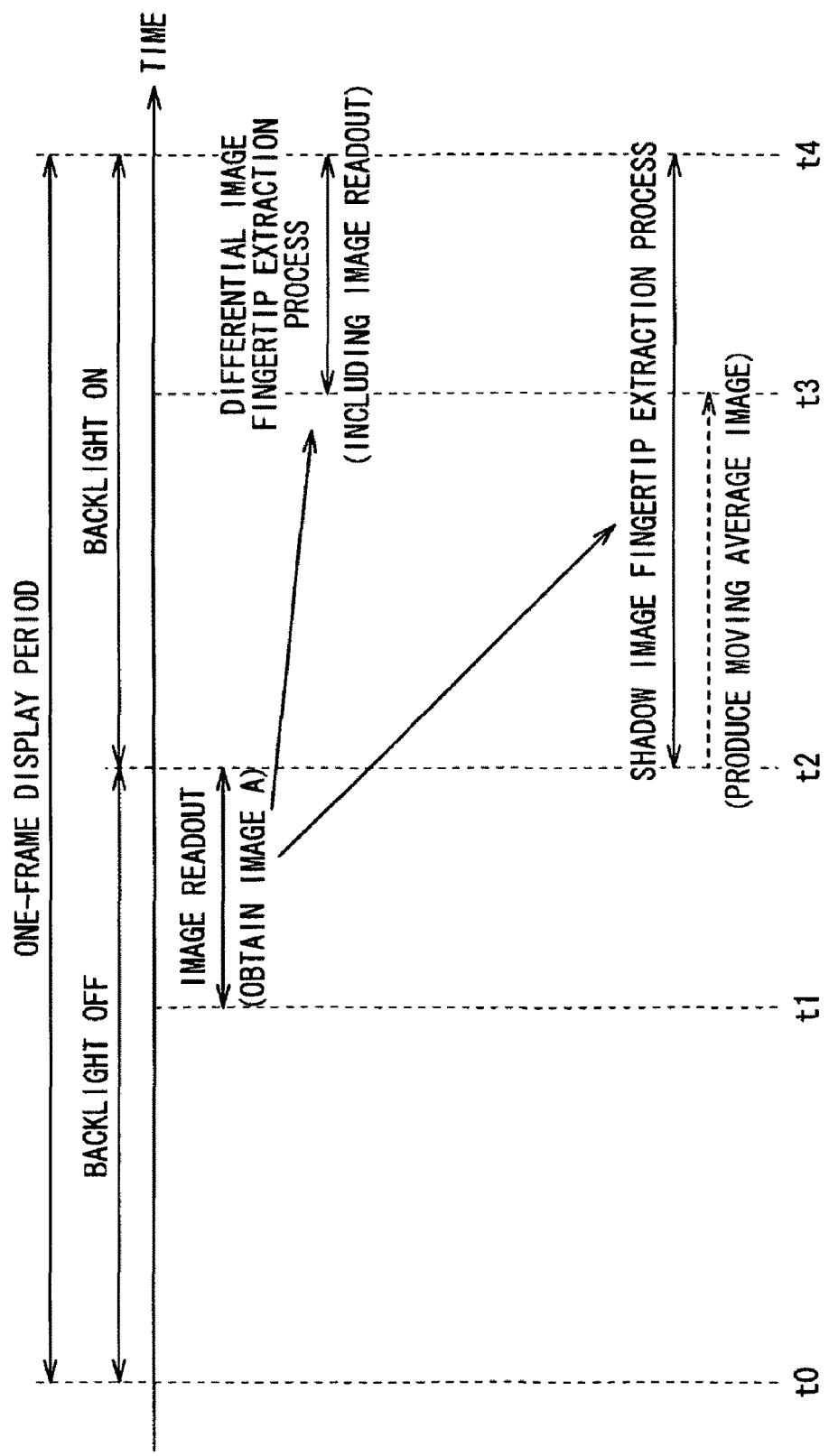
FIG. 7 is a timing chart for describing each extraction process shown in FIG. 6.

At first, in a period in which the backlight 15 is off (a non-lighting period) as the first half period of a one-frame display period, a process of picking up an image of the proximity object is performed by the I/O display panel 20 to obtain an image A (a shadow image) (step S11 in FIG. 6, refer to FIG. 7).

Next, in a period in which the backlight is on (a lighting period) as the second half period of the one-frame display period, a process of picking up an image of the proximity object by the I/O display panel 20 to obtain an image B (a display-light-utilized image) (refer to FIG. 7). Then, a fingertip extraction process (a differential image fingertip extraction process) on the basis of a differential image C between the image B and the image A is performed by the image processing section 14 (step S12).

Moreover, in parallel with the differential image fingertip extraction process, a fingertip extraction process (a shadow image fingertip extraction process) on the basis of the image A (the shadow image) is performed by the image processing section 14 (step S13, refer to FIG. 7).

Next, the image processing section 14 determines whether or not to use an extraction result by the differential image fingertip extraction process in step S12 which is selected from extraction results by the differential image fingertip extraction process and the shadow image fingertip extraction process in step S13 on the basis of the magnitude of a predetermined parameter which will be described later (step S14). In the case where the image processing section 14 determines to use the extraction result by the differential image fingertip extraction process on the basis of the magnitude of the predetermined parameter (step S14: Y), the image processing section 14 uses the extraction result by the differential image fingertip extraction process (step S15), and outputs a final result to the application program execution section 11 (step S17).

On the other hand, in the case where the image processing section 14 determines not to use the extraction result by the differential image fingertip extraction process on the basis of the magnitude of the predetermined parameter (step S14: N), the image processing section 14 uses the extraction result by the shadow image fingertip extraction process (step S16), and outputs a final result to the application program execution section 11 (step S17).

After that, the image processing section 14 determines whether or not to finish the whole fingertip extraction process by the image processing section 14 (step S18), and in the case where the image processing section 14 determines not to finish the fingertip extraction process yet (step S18: N), processes from steps S11 to S17 are repeated, and on the other hand, in the case where the image processing section 14 determines to finish the fingertip extraction process (step S18: Y), the fingertip extraction process is finished.

Thus, when an extraction result by one of the differential image fingertip extraction process and the shadow image fingertip extraction process is used on the basis of the magnitude of the predetermined parameter which will be described later, a switching process between these two fingertip extraction processes is performed.

Next, the differential image fingertip extraction process and the shadow image fingertip extraction process will be described in detail below.

Figure 8:
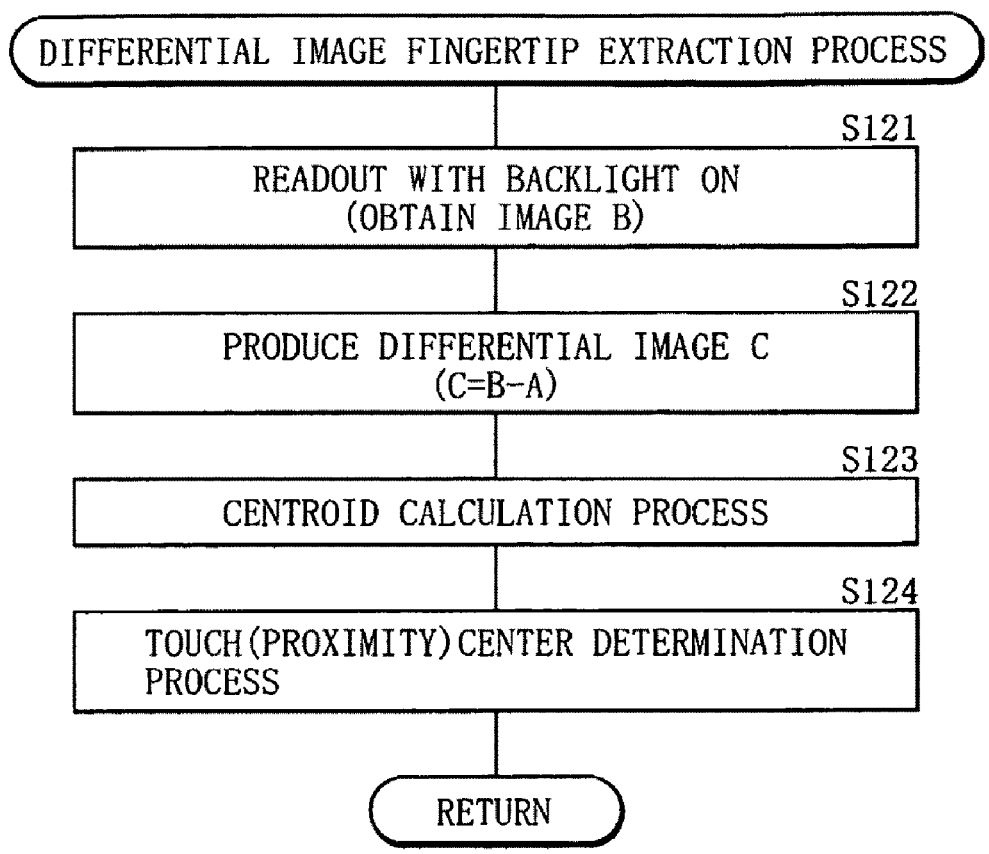
FIG. 8 is a flow chart showing details of a differential image fingertip extraction process shown in FIG. 7.

At first, referring to FIGS. 8 to 13A, 13B, 13C and 13D, the differential image fingertip extraction process will be described in detail below. FIG. 8 shows a flow chart of details of the differential image fingertip extraction process.

At first, as described above, in a period in which the backlight 15 is on (the lighting period) as the second half period of the one-frame display period, a process of picking up an image of the proximity object is performed by the I/O display panel 20 to obtain the image B (the display-light-utilized image) (step S121 in FIG. 8, refer to FIG. 7).

Next, the image processing section 14 produces the differential image C between the image B and the image A (the shadow image) obtained by image pickup in a period in which the backlight 15 is off (the non-lighting period) (step S122).

Then, the image processing section 14 performs arithmetic processing of determining the centroid of the produced differential image C (step S123) to determine the touch (proximity) center (step S124).

Figure 9:
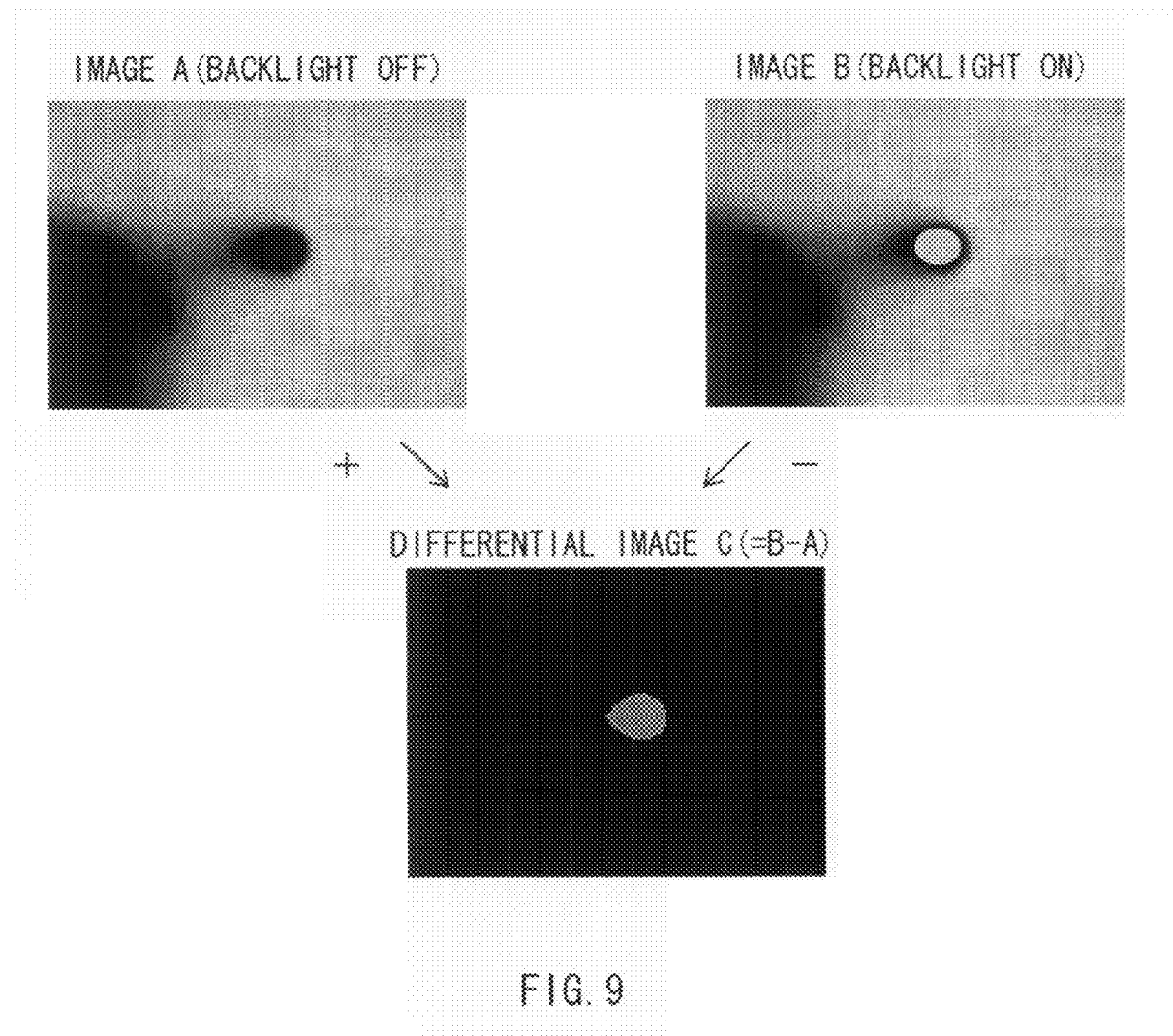
FIG. 9 is a photographic view for describing the differential image fingertip extraction process.

Thus, in the differential image fingertip extraction process, the fingertip extraction process is performed on the basis of the differential image C between the image B which is obtained through the use of display light and the image A which is obtained through the use of not display light but external light (environment light), so as shown in a photographic image example of the differential image C shown in FIG. 9, the influence of the brightness of external light is removed, and the proximity object is detected without the influence of the brightness of the external light.

Figure 10A:
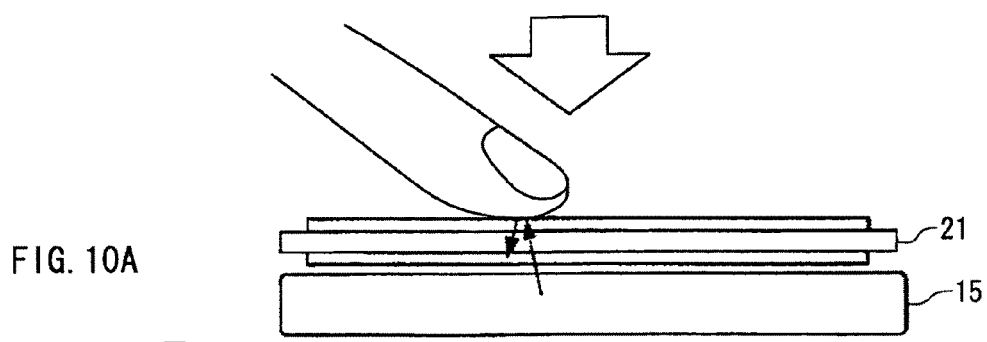
FIGS. 10A and 10B are illustrations for describing the differential image fingertip extraction process in the case where external light is bright.
Figure 10B:
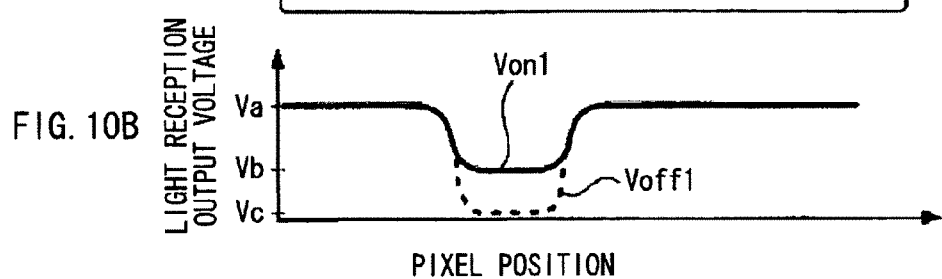

More specifically, for example, as shown in a sectional view in FIG. 10A, in the case where incident external light is strong, a light reception output voltage Von1 in a state in which the backlight 15 is on has a voltage value Va corresponding to the brightness of the external light at a point except for a point where a finger touches as shown in FIG. 10B, and at the point where the finger touches, the light reception output voltage Von1 is reduced to a voltage value Vb corresponding to reflectivity at which light from the backlight is reflected on a surface of an object (the finger) touching at this time. On the other hand, a light reception output voltage Voff1 in a state in which the backlight 15 is off has the voltage value Va corresponding to the brightness of external light at a point except for a point where the finger touches as in the case of the state in which the backlight 15 is on; however, the point where the finger touches is in a state in which the external light is blocked, so the light reception output voltage Voff1 has a voltage value Vc which is at a very low level at the point.

Figure 11A:
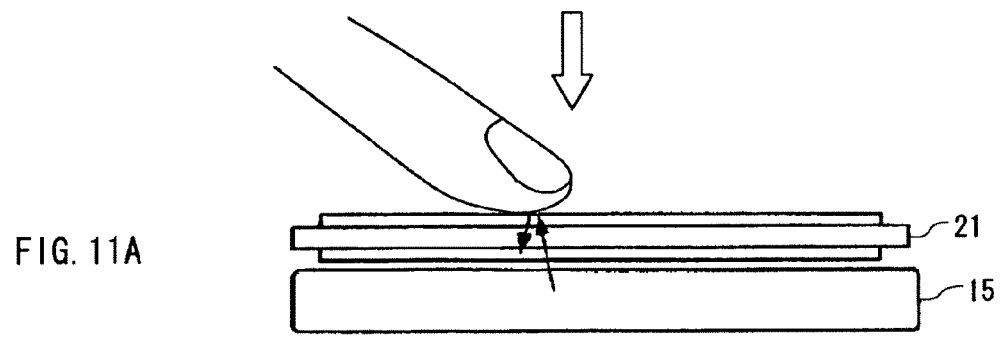
FIGS. 11A and 11B are illustrations for describing the differential image fingertip extraction process in the case where external light is dark.
Figure 11B:
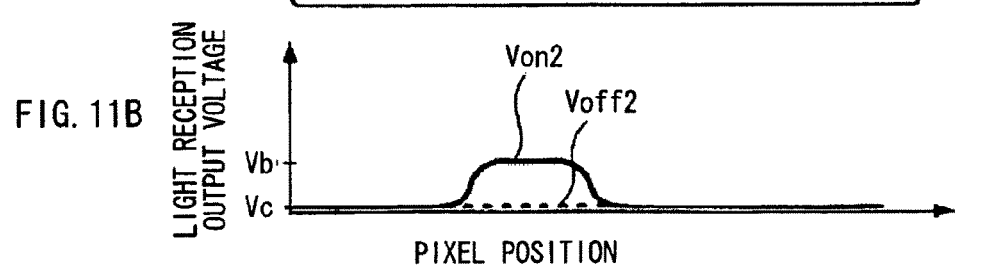

Moreover, as shown in a sectional view in FIG. 11A, in a state in which incident external light is weak (very little), as shown in FIG. 11B, a light reception output voltage Von2 in a state in which the backlight 15 is on has a voltage value Vc which is at a very low level at a point except for the point where the finger touches, because there is little external light, and at the point where the finger touches, the light reception output voltage Von2 is increased to a voltage value Vb corresponding to reflectivity at which light from the backlight is reflected. On the other hand, a light reception output voltage Voff2 in a state in which the backlight 15 is off remains at the voltage value Vc which is at a very low level and is not changed at both of the point where the finger touches and other points.

Thus, as can be seen from a comparison between FIGS. 10A and 10B and 11A and 11B, at a point where the object does not touch the display area 21 of a panel, the light reception output voltage is largely different between the case where external light is present and the case where the external light is not present. However, at a point where the finger touches, irrespective of the presence or absence of the external light, the voltage Vb when the backlight is on and the voltage Vc when the backlight is off are substantially in the same state.

Therefore, when a difference between the voltage when the backlight 15 is on and the voltage when the backlight 15 is off is detected, a point where there is a certain or larger difference between the voltages like a difference between the voltage Vb and the voltage Vc is determined as a point where the finger touches or comes in proximity, and even in the case where the external light entering into the panel is strong, or in the case where there is little external light, the object touching or coming in proximity to the panel is detected well under uniform conditions.

Figure 12A:
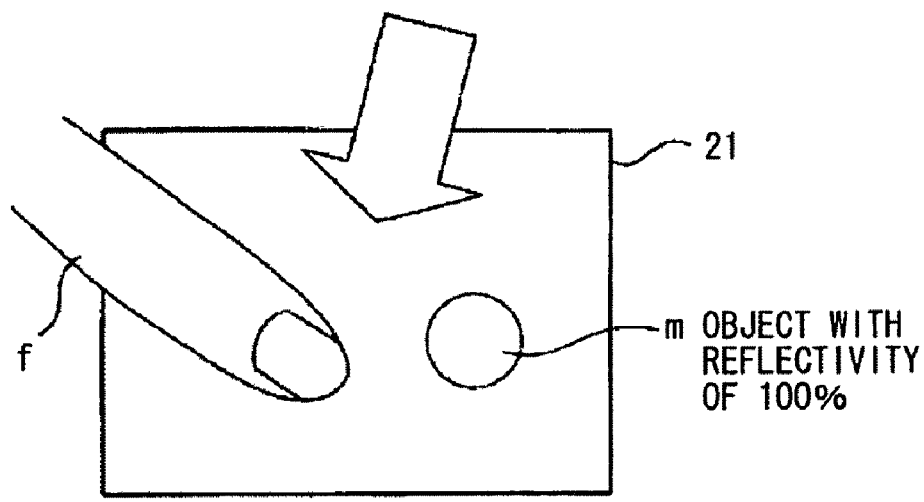
FIGS. 12A and 12B are illustrations for describing a dynamic range of a light reception signal by the differential image fingertip extraction process.
Figure 12B:
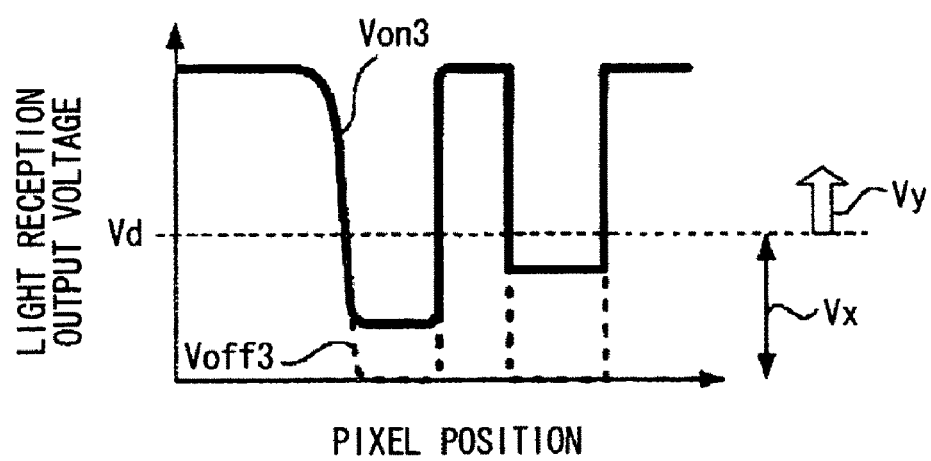
Figure 13A:
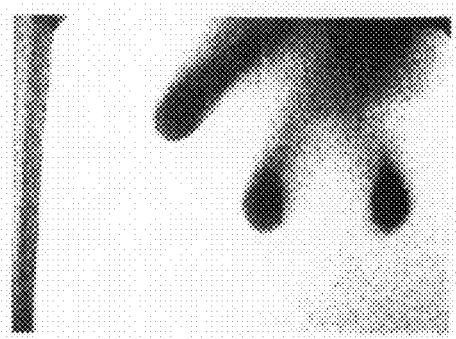
FIGS. 13A to 13D are photographic views for describing the differential image fingertip extraction process in the case where a plurality of fingertips to be detected are present at the same time.
Figure 13B:
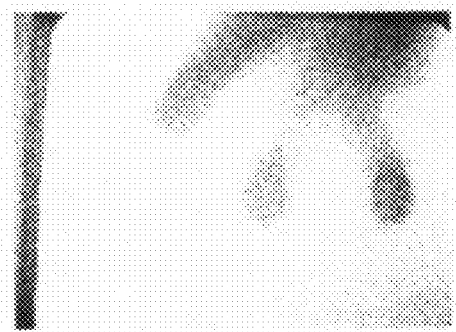
Figure 13C:
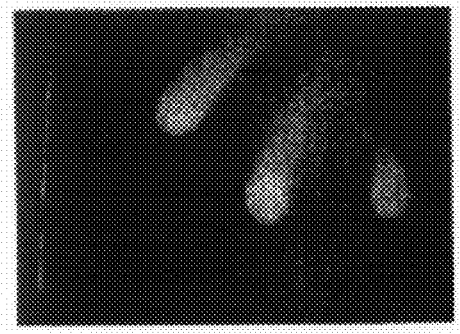
Figure 13D:
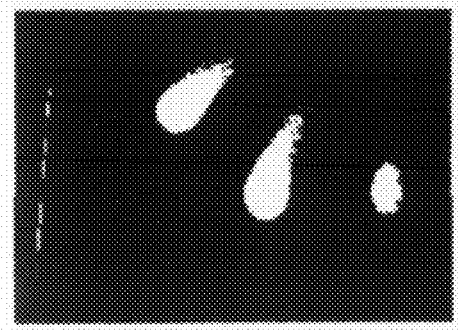

Moreover, as shown in FIGS. 12A and 12B, a dynamic range necessary to detect a light reception output voltage is determined as below. FIG. 12A shows a touch state of the display area 21 of the panel, in which a finger f touches a panel surface, and a circular object m with reflectivity of approximately 100% is placed on the display area 21. In this state, a light reception output voltage on a line where both of the finger f and the object m are scanned is turned into a state shown in FIG. 12B. Moreover, in FIG. 12B, a voltage Von3 is a light reception output voltage in a state in which the backlight is on, and a voltage Voff3 is a light reception output voltage in a state in which the backlight is off.

As shown in FIG. 12B, at a point where the object m with reflectivity of approximately 100% is placed, a higher voltage than a voltage Vd detected when the backlight is on is at a level Vy which is not necessary to be observed, and a range Vx which is equal to or lower than the level Vy is a dynamic range necessary for detection. Therefore, it should be understood that signals of level Vy which is unnecessary to be observed may be overflowed so as to be considered as a same level.

Moreover, also in the differential image fingertip extraction process, as shown by images (the images A to C and a binarized image of the image C) shown in FIGS. 13A to 13D, information about a plurality of touching or proximity objects which are placed on the display area 21 of the I/O display panel 20 at the same time such as the position, the shape, the size or the like of each of the objects is obtained.

Figure 14:
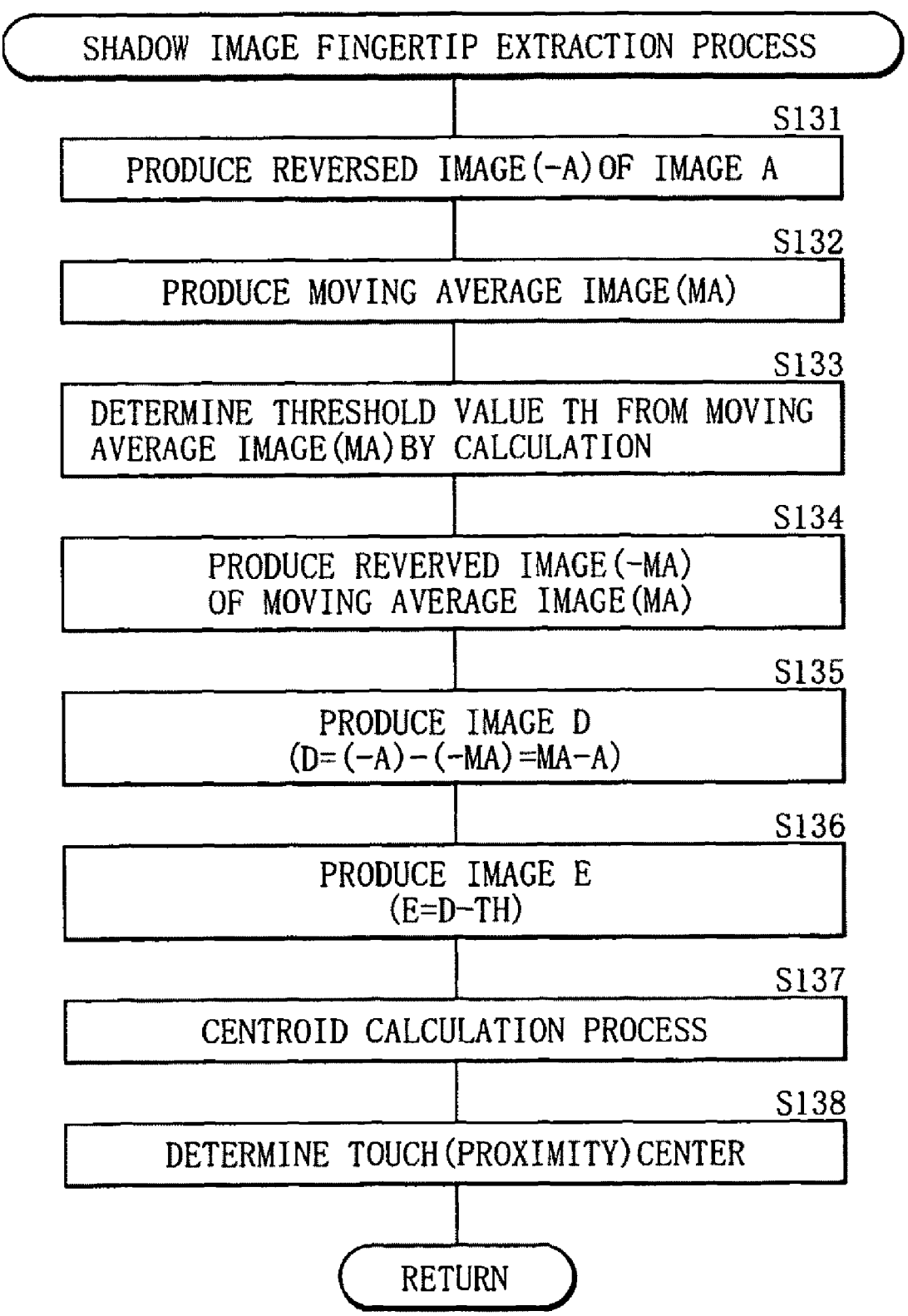
FIG. 14 is a flow chart showing details of a shadow image fingertip extraction process shown in FIG. 7.
Figure 15:
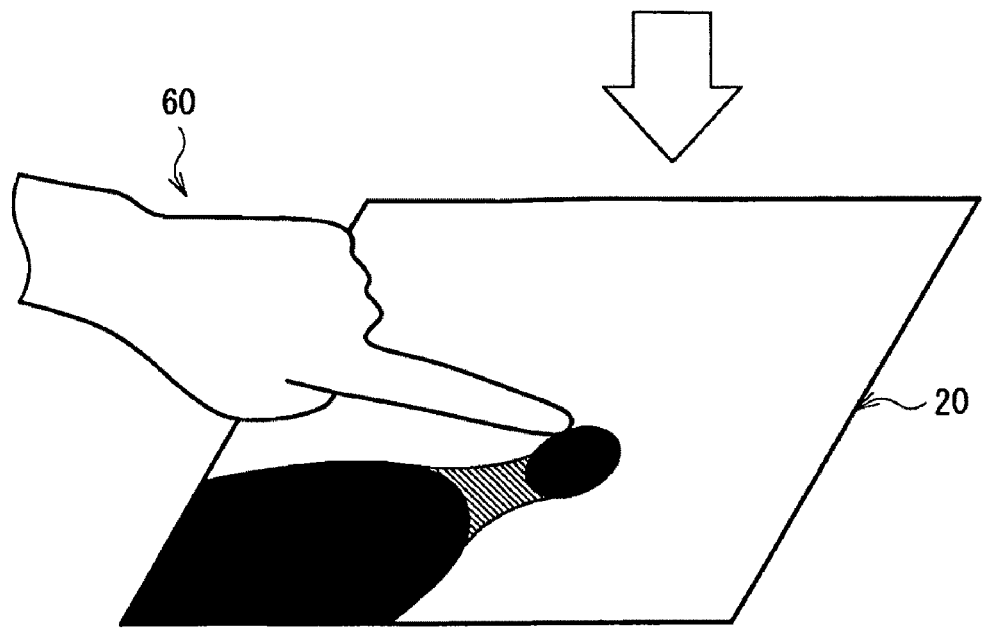
FIG. 15 is a perspective view for describing the concept of the shadow image fingertip extraction process.
Figure 16:
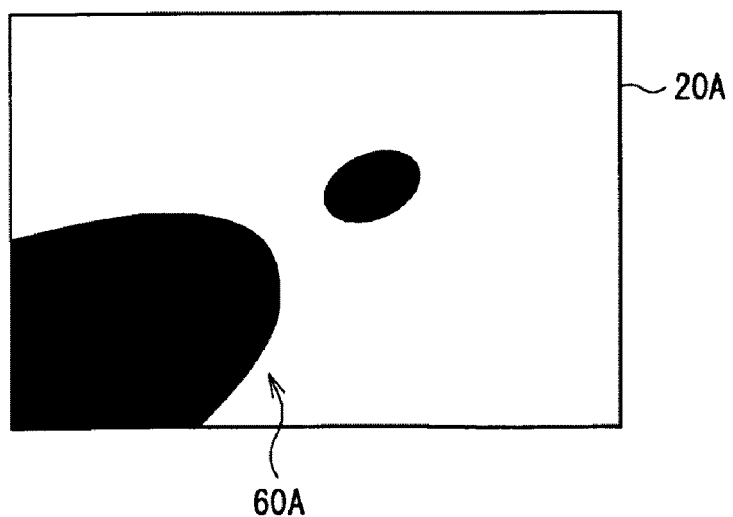
FIG. 16 is a schematic view showing an example of a picked-up image by the shadow image fingertip extraction process.

Next, referring to FIGS. 14 to 21, the shadow image fingertip extraction process will be described in detail below. FIG. 14 shows a flow chart of the details of the shadow image fingertip extraction process, and FIG. 15 shows a perspective view of a state in the shadow image fingertip extraction process.

At first, the image processing section 14 produces a reversed image (−A) of the image A (the shadow image) which is already obtained (step S131). Moreover, the image processing section 14 produces a moving average image MA of the original image A (step S132).

Figure 19A:
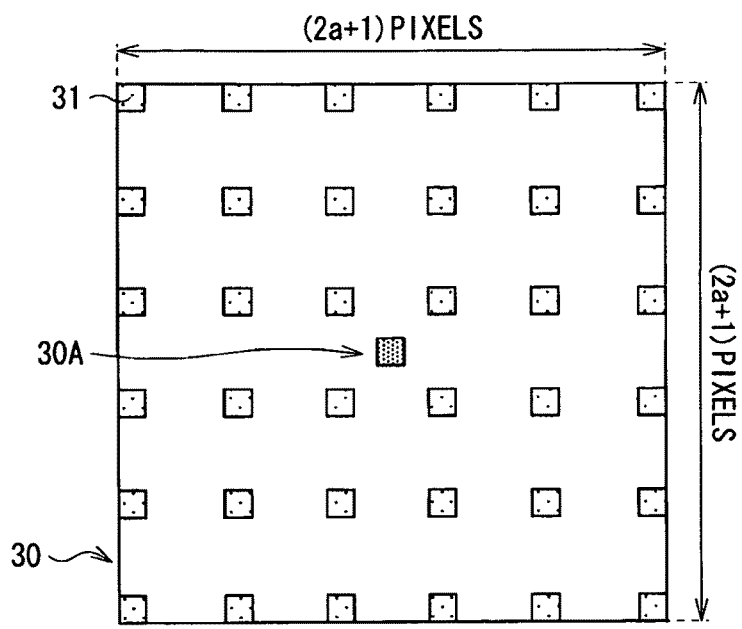
FIGS. 19A and 19B are illustrations for describing a moving average image producing process.
Figure 19B:
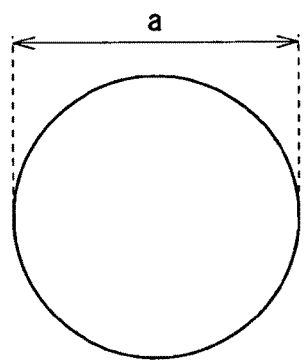
Figure 20:
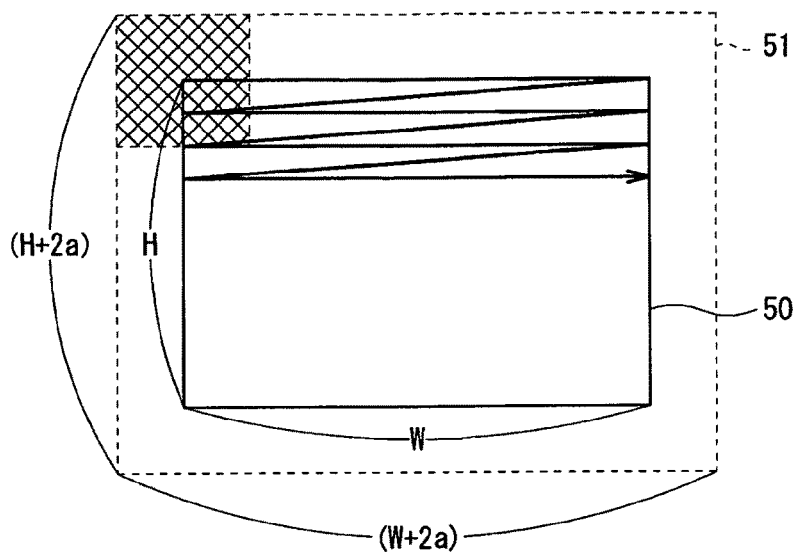
FIG. 20 is an illustration for describing the moving average image producing process.
Figure 21:
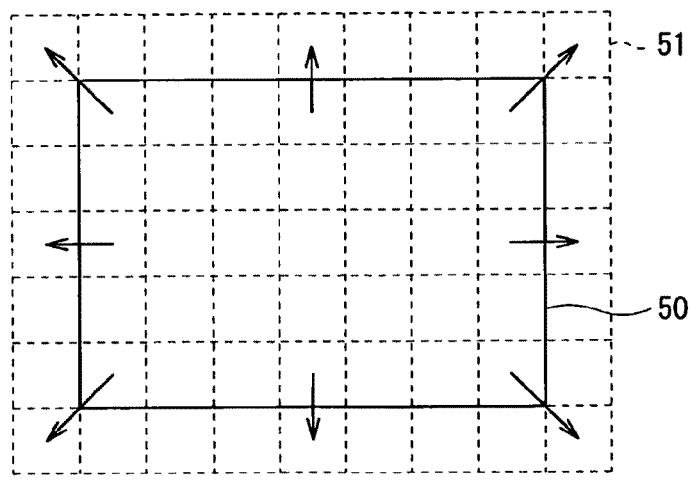
FIG. 21 is an illustration for describing the moving average image producing process.

To produce the moving average image MA, more specifically, for example, referring FIGS. 19A and 19B, in the image A, averaging arithmetic processing of pixel data is performed in a pixel region 30 including one marked pixel 30A and its peripheral pixels (in this case, a pixel region of (2a+1) pixels× (2a+1) pixels), and, for example, as shown in FIG. 20, while an arithmetic result is reflected in averaging arithmetic processing in a pixel region including the next marked pixel, a marked pixel is sequentially moved to perform averaging arithmetic processing on the whole picked-up image. Moreover, it is desirable that the size of a pixel region 50 in the averaging arithmetic processing (in this case, (2a+1) pixels× (2a+1) pixels) is set on the basis of an expected size as an object to be detected (a target size a) (for example, the size of the pixel region 50 is set to be equivalent to the target size a). Although the detail will be described later, it is because when the pixel region 50 has such a size, for example, unlike an image 20A (corresponding to an image D or an image E which will be described later) shown in FIG. 16, a first portion (a portion indicated by a reference numeral 60A) is prevented from being detected in addition to the fingertip as a proximity object. Further, for example, as shown in FIG. 21, for example, pixel data of a peripheral portion of the pixel region 50 may be copied as it is, and may be used as pixel data of a region 51 around the actual pixel region 50 which is necessary in the averaging arithmetic processing.

Next, the image processing section 14 determines a predetermined threshold value TH which is used in a subsequent step (step S136) from the moving average image MA by calculation (step S133). More specifically, the threshold value TH is determined on the basis of pixel data of the brightest pixel (having the largest pixel data) in the moving average image MA and pixel data of the darkest pixel (having the smallest pixel data) in the original image A (for example, by calculating the average of these pixel data). Moreover, assuming that proximity objects are not placed in the four corners of the display area 21 at the same time under normal conditions, the average value of the pixel data of pixels in the four corners may be allocated as the pixel data of the brightest pixel (having the largest pixel data).

Next, the image processing section 14 produces a reversed image (−MA) of the produced moving average image MA (step S134), and produces a differential image between the reversed image (−A) of the original image A and the reversed image (−MA) of the moving average image MA, that is, a differential image D=(−A)−(−MA)=MA−A between the moving average image MA and the original image A (step S136). Then, the image processing section 14 produces an image E=D−TH by subtracting the threshold value TH calculated in step S137 from each pixel data of the image D (step S137).

Figure 17:
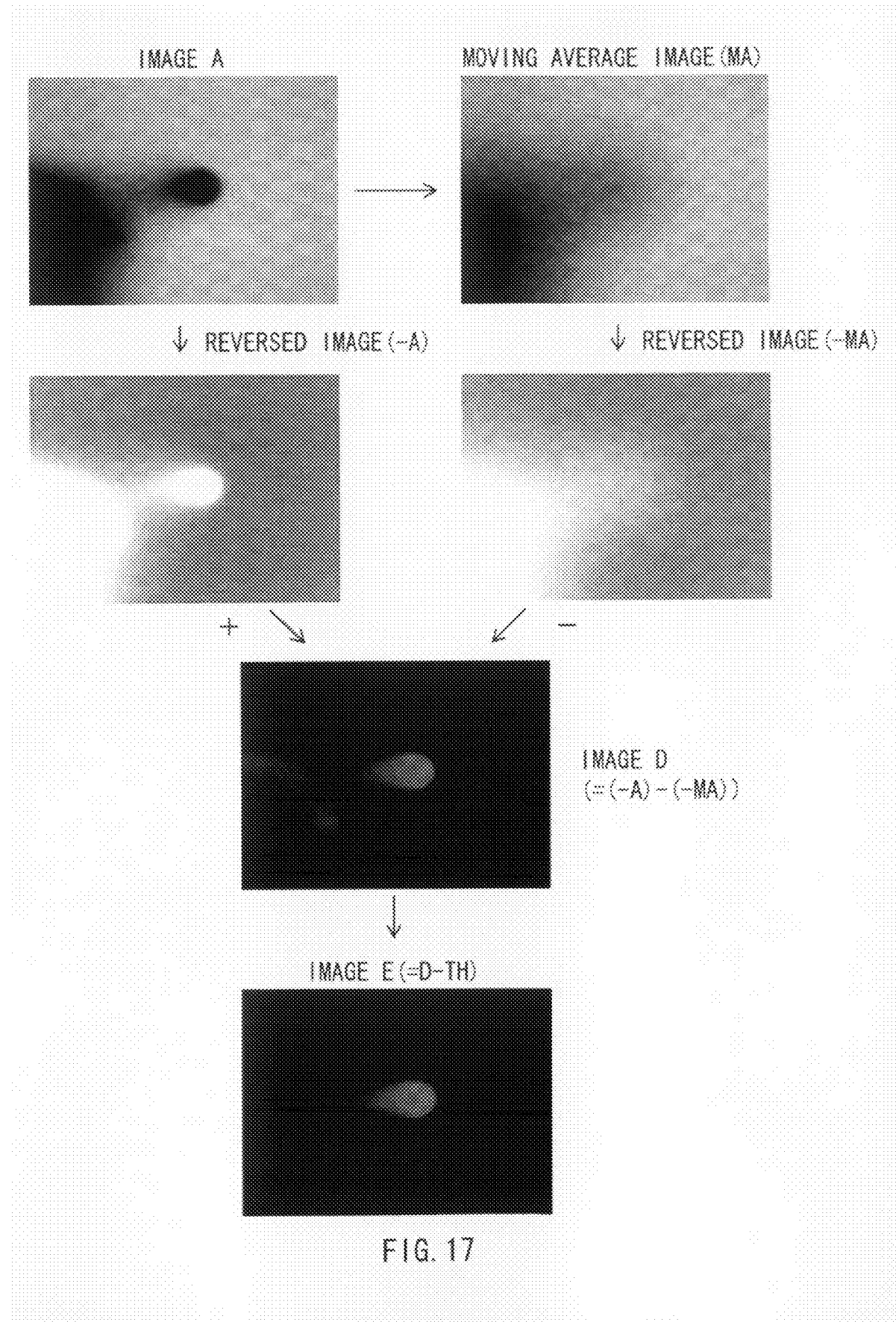
FIG. 17 is a photographic view for describing the shadow image fingertip extraction process.
Figure 18:
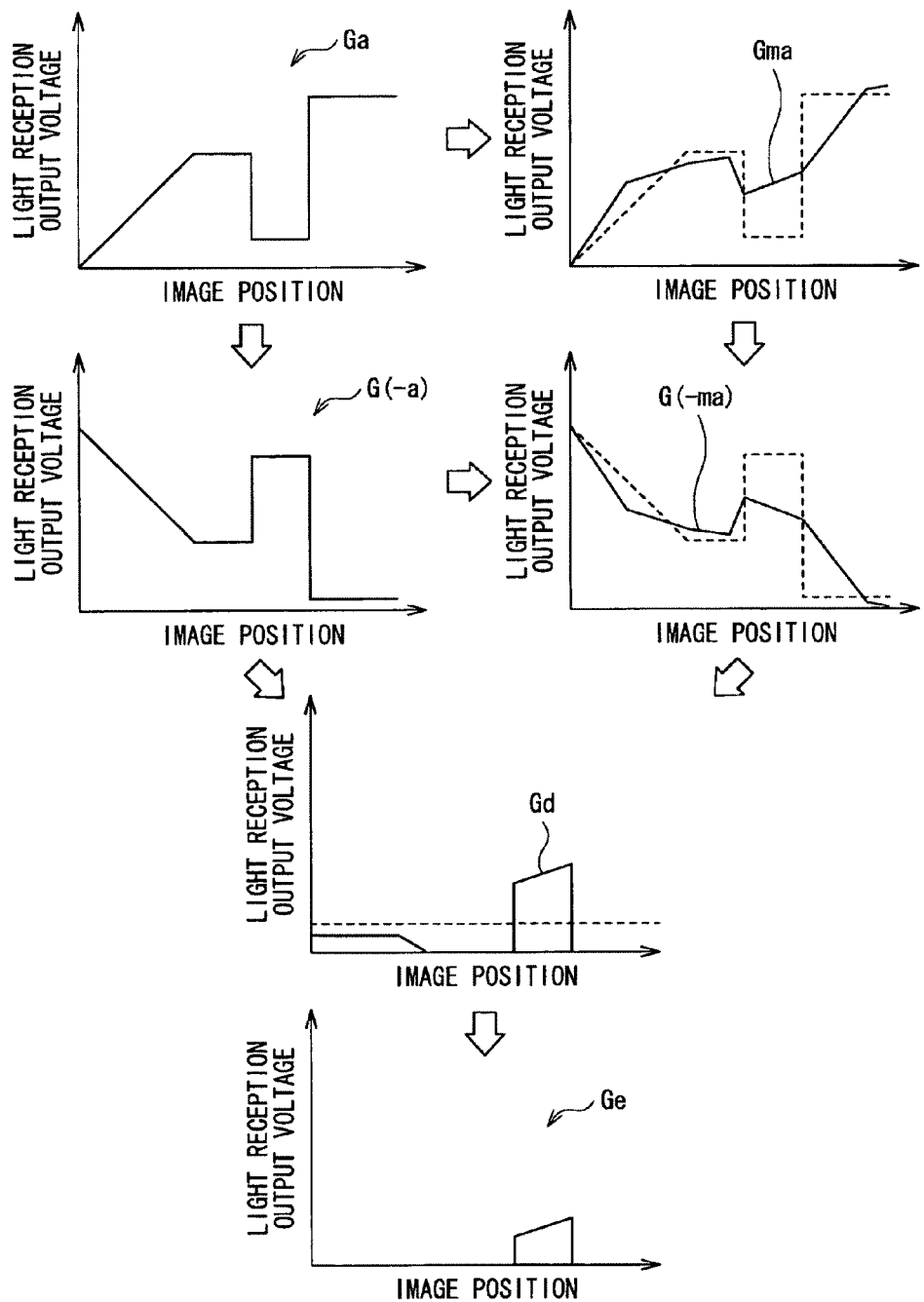
FIG. 18 is an illustration for describing a light reception signal by the shadow image fingertip extraction process.

As shown by the images D and E in FIG. 17 and light reception output voltage waveform examples Gd and Ge in the images D and E in FIG. 18, while only a fingertip portion with a size equivalent to the target size a is detected, a first portion which is larger than the fingertip is not detected. Moreover, the light reception output voltage waveform examples Ga, G(−a), Gma and G(−ma) shown in FIG. 18 correspond to light reception output voltage waveform examples in the original image A, the reversed image (−A) of the original image A, the moving average image MA and the reversed image (−MA) of the moving average image MA, respectively.

Next, as in the case of the above-described differential image fingertip extraction process, the image processing section 14 performs a centroid calculation process (step S137) and a touch (proximity) center determination process (step S138) on the basis of the image E.

Thus, in the shadow image fingertip extraction process, the fingertip extraction process is performed on the basis of the differential image D between the moving average image MA of the image A picked up through the use of external light and the original image A, so as described above, only an object with a size equivalent to the target size is detected, and even in the case where display light is not emitted, (for example, in the case where the backlight 15 is constantly off such as the case where a liquid crystal device as a display device is a semi-transparent liquid crystal device, and is used in the open air, the case where a black image is displayed on the I/O display panel 20, or the like), the proximity object is detected.

In addition, also in the shadow image fingertip extraction process, as in the case of the differential image fingertip extraction process, information about a plurality of touching or proximity objects which are placed on the display area 21 of the I/O display panel 20 at the same time such as the position, the shape, the size or the like of each of the objects is obtained.

Thus, a detection result of the proximity object by one of the above-described differential image fingertip extraction process and the above-described shadow image fingertip extraction process is used as a final result to be outputted from the image processing section 14 to the application program execution section 11.

FIG. 22 shows characteristics of the fingertip extraction processes by the shadow image fingertip extraction process and the differential image fingertip extraction process by comparison. In the drawing, a circular symbol indicates being suitable for the fingertip extraction process under a corresponding condition, a triangular symbol indicates that depending on circumstances, being suitable or not suitable for the fingertip extraction process under a corresponding condition, and a cross symbol indicates being not suitable for the fingertip extraction process under a corresponding condition in principle. As shown in the drawing, in a bright environment, the differential image fingertip extraction process is more suitable for the fingertip extraction process, so it is considered an extraction result by the differential image fingertip extraction process is used, and on the other hand, in the case where the backlight 15 is off, and display light is not emitted, or in a black display state, extraction may not be performed by the fingertip extraction process, so in this case, it is considered that an extraction result by the shadow image fingertip extraction process is used.

Figure 23:
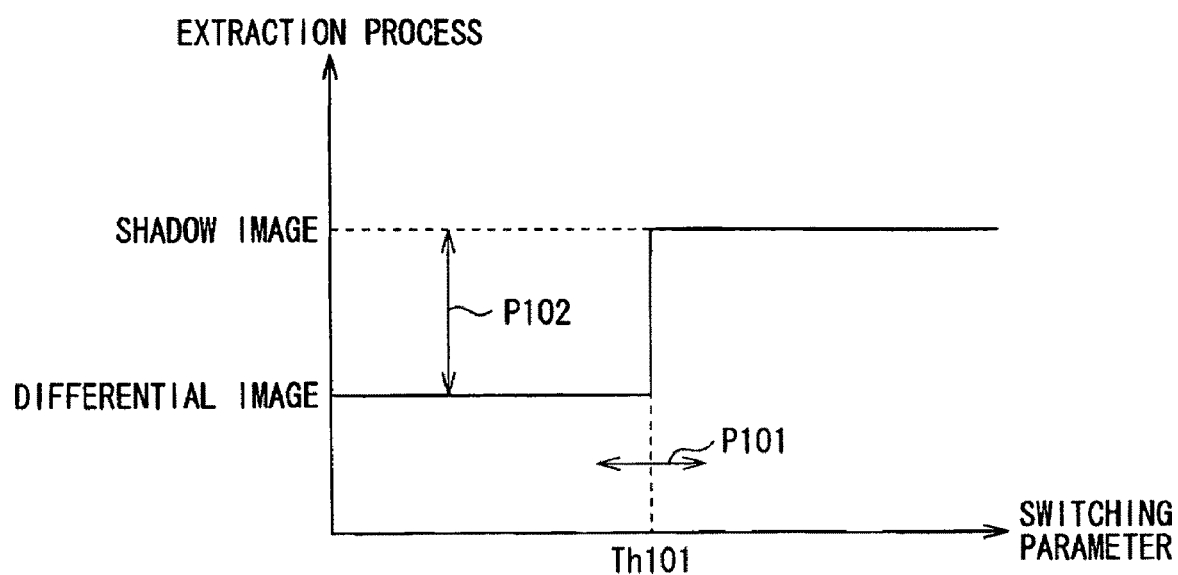
FIG. 23 is an illustration for describing a switching process between extraction processes according to a comparative example.

Next, referring to FIGS. 23 to 25, a switching process between the differential image fingertip extraction process and the shadow image fingertip extraction process as one of characteristic parts of the invention will be described in comparison with a comparative example.

At first, in a comparative example shown in FIG. 23, a switching process between differential image fingertip extraction process and the shadow image fingertip extraction process is performed on the basis of the magnitude of a predetermined switching parameter (for example, illuminance of environment light or display luminance which will be described later) depending on whether or not the switching parameter is larger than a predetermined switching threshold value Th101. More specifically, when the switching parameter is equal to or smaller than the switching threshold value Th101, an extraction result by the differential image fingertip extraction process is used, and on the other hand, when the switching parameter is larger than the switching threshold value Th101, an extraction result by the shadow image fingertip extraction process is used. However, for example, as indicated by an arrow P101 in the drawing, when the switching parameter fluctuates around the switching threshold value Th101, as indicated by an arrow P102 in the drawing, switching between the differential image fingertip extraction process and the shadow image fingertip extraction process is frequently performed. Then, when switching between the fingertip extraction processes is performed with such a high frequency, the operation of detecting the position or the like of the proximity object becomes unstable.

On the other hand, in the embodiment, in the case where the predetermined parameter is increasing, when the parameter reaches a first switching threshold value, a switching process from one of two fingertip extraction processes to the other fingertip extraction process is performed, and on the other hand, in the case where the parameter is decreasing, when the parameter reaches a second switching threshold value which is smaller than the first switching threshold value, a switching process from the other fingertip extraction process to the one fingertip extraction process is performed. In other words, a switching process between two fingertip extraction processes is performed through the use of hysteresis.

Figure 24A:
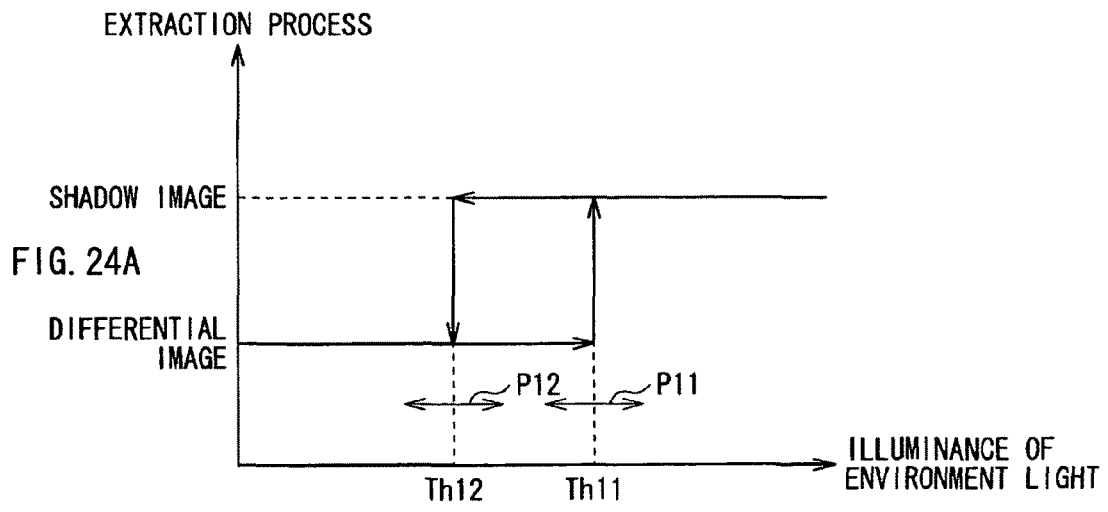
FIGS. 24A and 24B are illustrations for describing a switching process between extraction processes according to the first embodiment.
Figure 25:
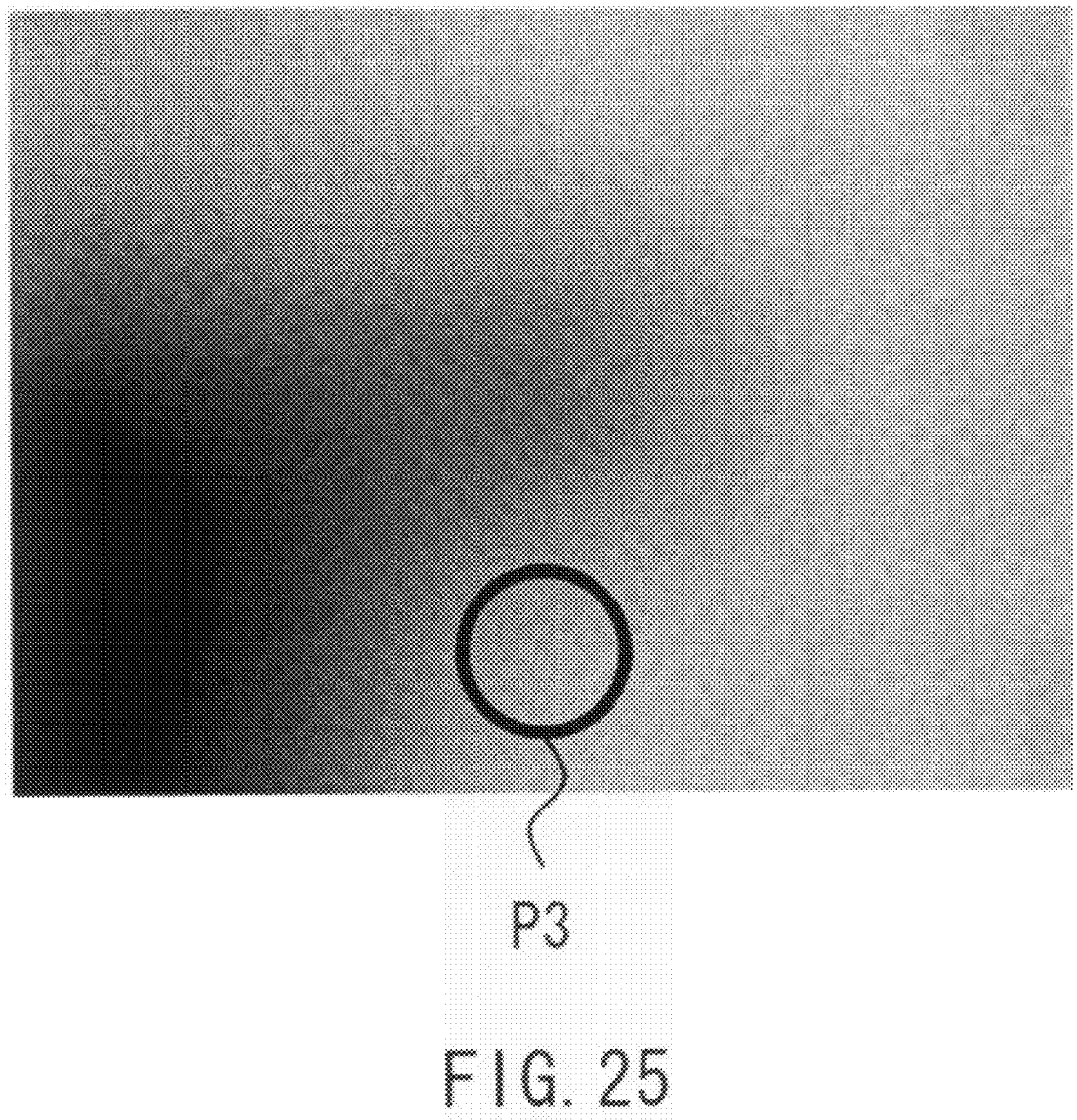
FIG. 25 is a photographic view for describing an example of a method of detecting illuminance of environment light shown in FIG. 24A.

More specifically, for example, as shown in FIG. 24A, in the case where the illuminance of environment light (external light) is used as a predetermined parameter, a switching process between the shadow image fingertip extraction process and the differential image fingertip extraction process is performed on the basis of the illuminance of the environment light, and in the case where the illuminance of the environment light is increasing, when the illuminance of the environment light reaches a first illuminance threshold value Th11, a switching process from the differential image fingertip extraction process to the shadow image fingertip extraction process is performed, and on the other hand, in the case where the illuminance of the environment light is decreasing, when the illuminance of the environment light reaches a second illuminance threshold value Th12 which is smaller than the first illuminance threshold value Th11, a switching process from the shadow image fingertip extraction process to the differential image fingertip extraction process is performed.

In addition, the moving average image (MA) of the above-described shadow image may be used to measure such illuminance of environment light. More specifically, for example, as shown in FIG. 25, a portion having the highest brightness (a portion indicated by a reference numeral P3 in the drawing) of the moving average image (MA) is used as a value indicating the brightness of an ambient environment (an illuminance value of environment light). When the moving average image (MA) is used in such a manner, an influence of variations in light reception sensor output of the I/O display panel 20 becomes negligible.

Figure 24B:
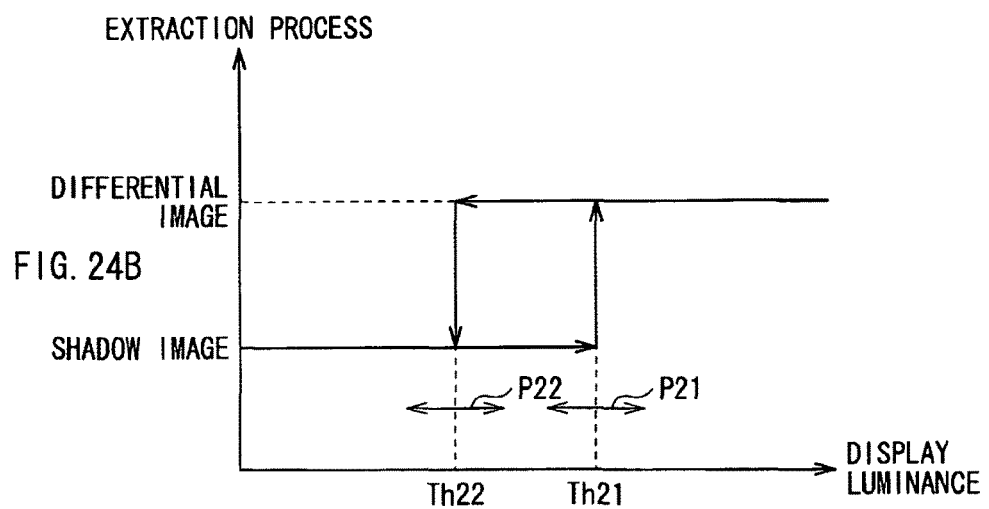

Moreover, for example, as shown in FIG. 24B, in the case where the display luminance of the I/O display panel 20 is used as a predetermined parameter, a switching process between the shadow image fingertip extraction process and the differential image fingertip extraction process is performed on the basis of the display luminance, and in the case where the display luminance is increasing, when the display luminance reaches a first luminance threshold value Th21, a switching process from the shadow image fingertip extraction process to the differential image fingertip extraction process is performed, and on the other hand, in the case where the display luminance is decreasing, when the display luminance reaches a second luminance threshold value Th22 which is smaller than the first luminance threshold value Th21, a switching process from the differential image fingertip extraction process to the shadow image fingertip extraction process is performed.

Therefore, for example, as shown by arrows P11, P12, P21 and P22 in FIGS. 24A and 24B, even in the case where the illuminance of environment light or display luminance fluctuates around the threshold values Th11, Th12, Th21 or Th22, the switching process between two fingertip extraction processes is prevented from being performed with each fluctuation of the illuminance of environment light or display luminance, so switching between the fingertip extraction processes with as high a frequency as that in the comparative example is prevented.

As described above, in the embodiment, the switching process between two fingertip extraction processes is performed on the basis of the magnitude of the predetermined parameter, and in the case where the parameter is increasing, when the parameter reaches a first threshold value, a switching process from one of two fingertip extraction processes to the other fingertip extraction process is performed, and on the other hand, in the case where the parameter is decreasing, when the parameter reaches a second threshold value which is smaller than the first threshold value, a switching process from the other fingertip extraction process to the one fingertip extraction process is performed; therefore, for example, even in the case where the parameter fluctuates around the first threshold value or the second threshold value, switching between the fingertip extraction processes with a high frequency is prevented. Therefore, irrespective of use conditions, an object is stably detectable.

Moreover, the moving average image MA is produced on the basis of the image A, and an object is detected on the basis of the differential image D between the moving average image MA and the original image A, and the image E obtained by subtracting the threshold value TH from each pixel data of the differential image D, and the size of the pixel region 50 in the averaging arithmetic processing is set to be equivalent to an expected size as an object to be detected (the target size), thereby a first portion larger than a fingertip is prevented from being detected, so a detection process is performed more reliably.

Further, the image A (the shadow image) is obtained before obtaining the image B (the display-light-utilized image) in one operation period (a one-frame display period); therefore, for example, as shown in FIG. 7, the time of performing the arithmetic operation of the moving average image MA which takes some time is securable before performing the differential image fingertip extraction process, and compared to the case where the image B is obtained before obtaining the image A, the whole process is performed for a shorter time.

Second Embodiment

Next, a second embodiment of the invention will be described below. A display-and-image-pickup apparatus according to the embodiment performs both of the differential image fingertip extraction process and the shadow image fingertip extraction process in any cases, and performs the fingertip extraction process through the use of a synthesized image from the image A (the shadow image) and the differential image C. Moreover, a plurality of combinations of weighting coefficients ($\alpha$ and $\beta$ which will be described later) when synthesizing "a synthesized image from a shadow image and a differential image" are registerable. In addition, other configurations and operations are the same as those in the first embodiment, and will not be further described.

Figure 26:
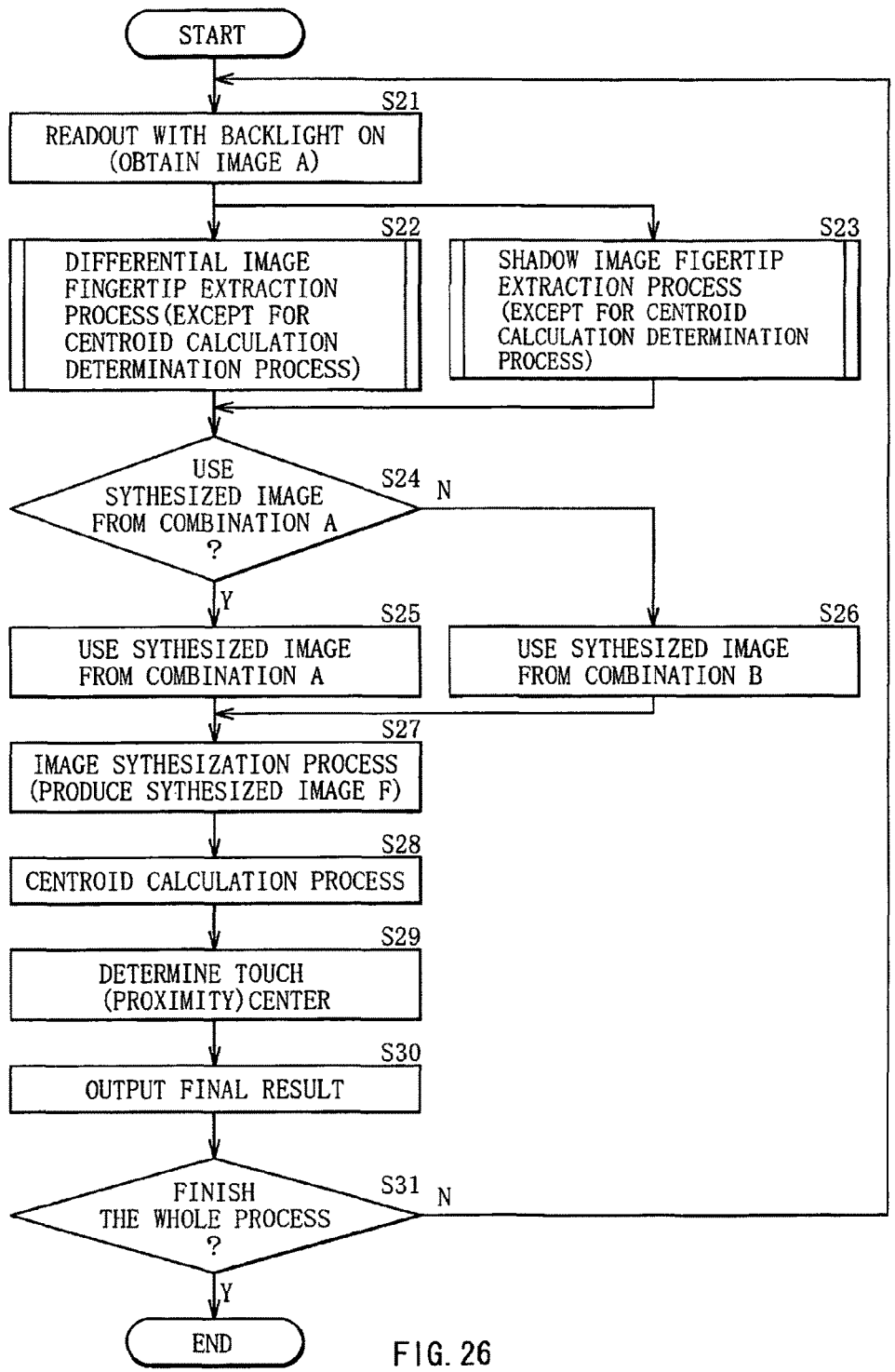
FIG. 26 is a flow chart showing a fingertip extraction process according to a second embodiment of the invention.

FIG. 26 shows a flow chart of a fingertip extraction process according to the embodiment. As shown in the drawing, when the image A (the shadow image) is obtained as in the case of the first embodiment (step S21), the differential image fingertip extraction process and the shadow image fingertip extraction process are respectively executed except for the centroid calculation process and the touch (proximity) center determination process. (steps S22 and S23).

Next, the image processing section 14 determines whether or not to use a synthesized image from a combination (a combination of weighting coefficients α and β) A which will be described later as a synthesized image F from the differential image C obtained in the differential image fingertip extraction process in step S12 and the shadow image A obtained in the shadow image fingertip extraction process in step S13 (more specifically, the image E on the basis of the shadow image A) on the basis of the magnitude of a predetermined parameter (for example, illuminance of environment light) which will be described later (step S24). In the case where the image processing section 14 determines to use a synthesized image from the combination A on the basis of the magnitude of the predetermined parameter (step S24: Y), the image processing section 14 uses the synthesized image (step S25). On the other hand, in the case where the image processing section 14 determines not to use the synthesized image from the combination A (step S24: N), the image processing section 14 uses a synthesized image from a combination B which will be described later (step S26).

Figure 27:
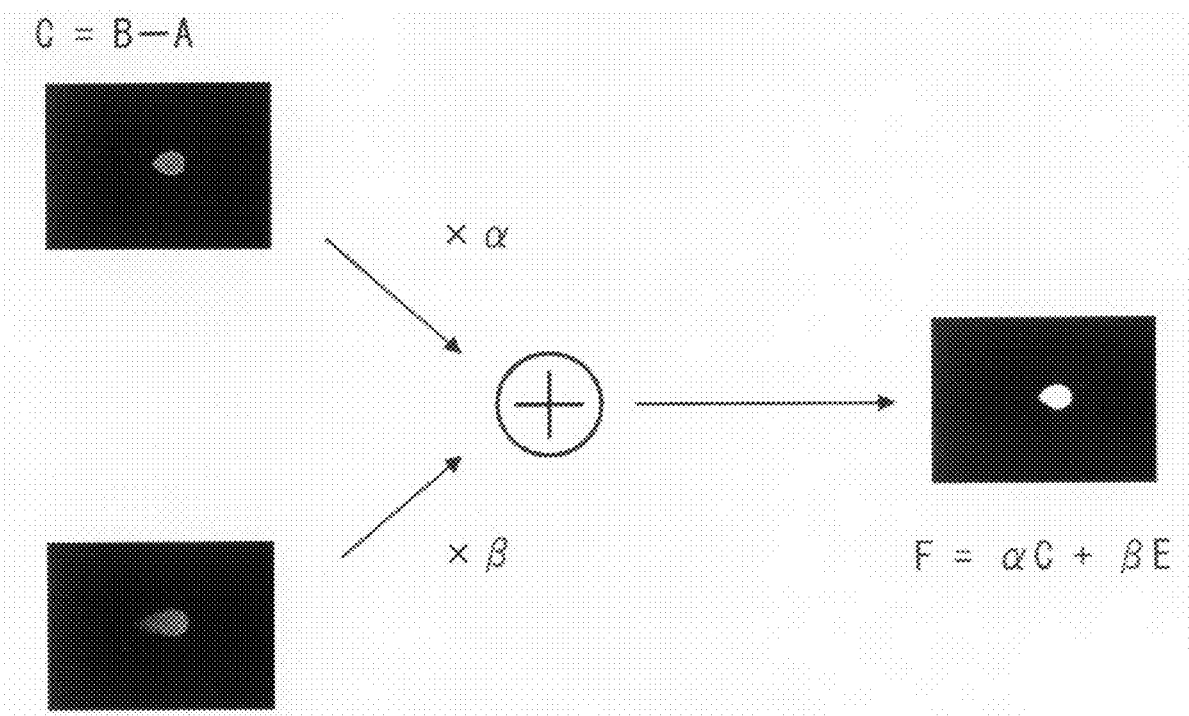
FIG. 27 is a photographic view for describing an image synthesizing process shown in FIG. 26.

Next, for example, as shown in FIG. 27, a synthesized image F=α×C+β×E from the differential image C produced by the differential image fingertip extraction process and the image E produced by the shadow image fingertip extraction process is produced (step S27). In addition, α and β indicate weighting coefficients for the differential image C and the image E, respectively, and a plurality of combinations of the weighting coefficient α and β are prepared (for example, α, β=½, 1, 2, 4, 8 or the like).

After that, as in the case of the first embodiment, the image processing section 14 performs the centroid calculation process (step S28), the touch (proximity) center determination process (step S29) and a final result output process (step S30) are performed, and it is determined whether or not to finish the fingertip extraction process by the image processing section 14 (step S31). Then, in the case where it is determined not to finish the fingertip extraction process yet (step S31: N), processes from steps S21 to S30 are repeated, and on the other hand, in the case where it is determined to finish the fingertip extraction process (step S31: Y), the fingertip extraction process is finished.

Thus, when one of the synthesized images F synthesized from two combinations A and B which are different combinations of the weighting coefficients α and β in image synthesization is used on the basis of the magnitude of a predetermined parameter which will be described later, a switching process between the fingertip extraction processes using the synthesized images F from these two combinations A and B is performed.

Next, referring to FIGS. 28 to 31A and 31B, a switching process between the fingertip extraction processes using the synthesized images F from two combinations A and B as one of characteristic parts of the invention will be described in comparison with a comparative example.

Figure 28:
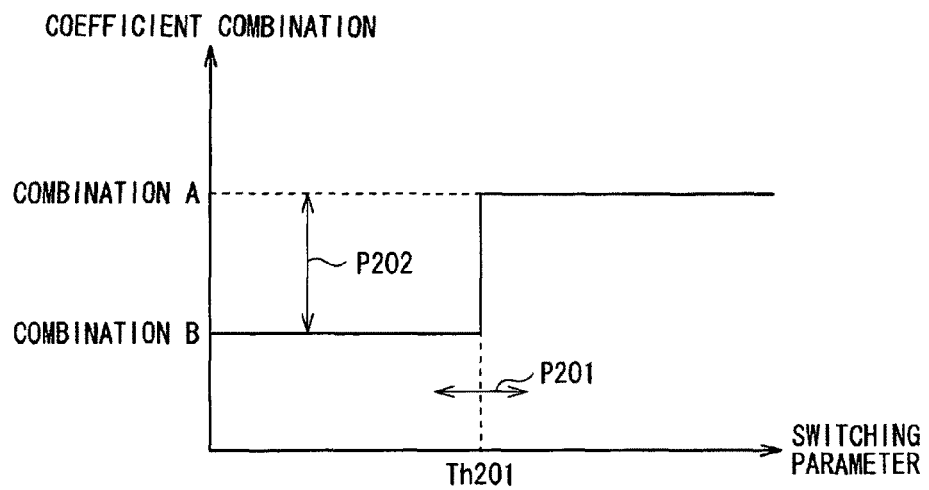
FIG. 28 is an illustration for describing a switching process between coefficient combinations according to a comparative example.

At first, in a comparative example shown in FIG. 28, on the basis of the magnitude of a predetermined switching parameter (for example, illuminance of environment light which will be described later), a switching process between a fingertip extraction process using the synthesized image F from the combination A and a fingertip extraction process using the synthesized image F from the combination B is performed depending on whether or not the switching parameter is larger than a predetermined switching threshold value Th201. More specifically, when the switching parameter is equal to or smaller than the switching threshold value Th201, the fingertip extraction process using the synthesized image F from the combination B is used, and when the switching parameter is larger than the switching threshold value Th201, the fingertip extraction process using the synthesized image F from the combination A is used. However, for example, as shown by an arrow P201 in the drawing, when the switching parameter fluctuates around the switching threshold value Th201, as shown by an arrow P202 in the drawing, switching between the fingertip extraction process using the synthesized image F from the combination A and the fingertip extraction process using the synthesized image F from the combination B is frequently performed. Then, when switching between the fingertip extraction processes is performed with such a high frequency, the operation of detecting the position or the like of the proximity object becomes unstable.

On the other hand, in the embodiment, in the case where the predetermined parameter is increasing, when the parameter reaches a first switching threshold value, a switching process from the fingertip extraction process using a synthesized image from one of the combinations A and B to the fingertip extraction process using a synthesized image from the other combination is performed, and on the other hand, in the case where the parameter is decreasing, when the parameter reaches a second switching threshold value which is smaller than the first switching threshold value, a switching process from the fingertip extraction process using the synthesized image from the other combination to the fingertip extraction process using the synthesized image from the one combination is performed. In other words, a switching process between the fingertip extraction processes using the synthesized images from two combinations A and B is performed through the use of hysteresis.

Figure 29:
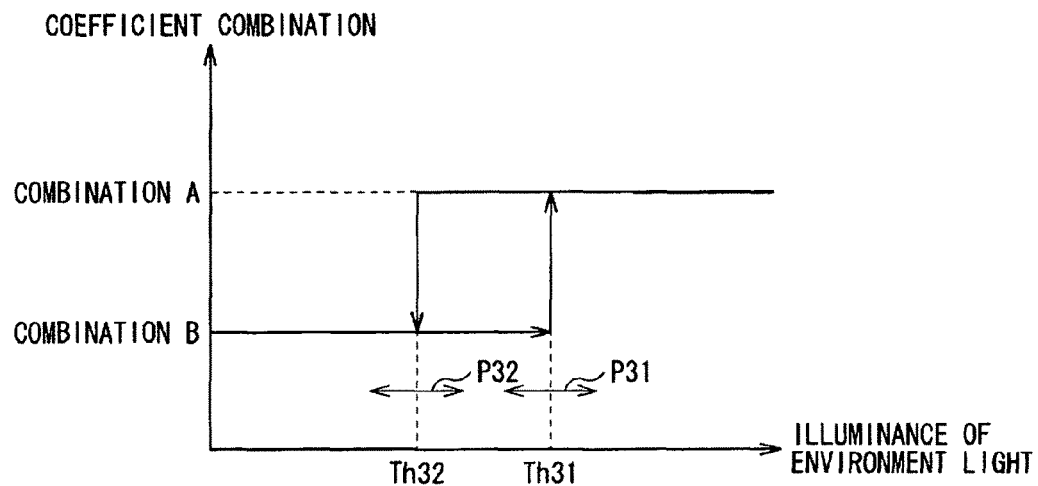
FIG. 29 is an illustration for describing a switching process between coefficient combinations according to the second embodiment.

More specifically, for example, as shown in FIG. 29, in the case where the illuminance of environment light (external light) is used as the predetermined parameter, the switching process between the fingertip extraction processes using the synthesized images from two combinations A and B is performed on the basis of the illuminance of environment light, and in the case where the illuminance of the environment light is increasing, when the illuminance of environment light reaches a first illuminance threshold value Th31, a switching process from the fingertip extraction process using the synthesized image from the combination B to the fingertip extraction process using the synthesized image from the combination A is performed, and on the other hand, in the case where the illuminance of environment light is decreasing, when the illuminance of environment light reaches a second illuminance threshold value Th32 which is smaller than the first illuminance threshold value Th31, a switching process from the fingertip extraction process using the synthesized image from the combination A to the fingertip extraction process using the synthesized image from the combination B is performed.

Thereby, for example, as shown by arrows P31 and P32 in FIG. 29, even in the case where the illuminance of environment light fluctuates around the threshold value Th31 or Th32, the switching process between the fingertip extraction processes using the synthesized images from two combinations A and B is prevented from being performed with each fluctuation of the illuminance of environment light, so as in the case of the first embodiment, switching between the fingertip extraction processes with as high a frequency as that in the comparative example is prevented.

In this case, as the fingertip extraction processes using the synthesized images from the combinations A and B, as will be described later referring to FIGS. 30A, 30B, 31A and 31B, two examples are considered depending on which of weighting coefficients for the differential image C and the image E on the basis of the shadow image A is set to be larger (which of the weighting coefficients $\alpha$ and $\beta$ is set to be larger).

At first, as one of the two examples, for example, as shown in FIGS. 30A and 30B, while in a synthesized image F1$a$ from a combination A1, the weighting coefficient $\alpha$ of the differential image C is smaller than the weighting coefficient $\beta$ of the image E produced by shadow detection (for example, $\alpha=\frac{1}{2}$, $\beta=2$), in a synthesized image F1$b$ from a combination B1, the weighting coefficient $\alpha$ of the differential image C is larger than a weighting coefficient $\beta$ of the image E produced by shadow detection (for example, $\alpha=4$, $\beta=\frac{1}{2}$). In such a configuration, in a dark environment, when the value of the differential image C is mainly used, a dark-current noise is prevented, and on the other hand, in a bright environment, when the value of the image E on the basis of the shadow image A is mainly used, a differential edge shown by an arrow P4 in FIG. 30B is prevented. Therefore, the configuration example is desirable mainly in the case where sensitivity to light is low in the I/O display panel 20, or the like, because more suitable image processing for ambient environment is possible. In other words, the example is configured so as to use output with higher sensitivity, and prevent noisy output. In addition, the above-described differential edge (aliasing) occurs in the case where in a differential image fingertip extraction process under strong external light, a target object moves at high speed, or the like by a time difference between picking up images A and B and the influence of external light.

Moreover, as the other example, for example, as shown in FIGS. 31A and 31B, in a synthesized image F2$a$ from a combination A2, the weighting coefficient $\alpha$ of the differential image C is larger than the weighting coefficient $\beta$ of the image E produced by shadow detection (for example, $\alpha=4$, $\beta=1$), and on the other hand, in a synthesized image F2$b$ from a combination B2, the weighting coefficient $\alpha$ of the differential image C is smaller than the weighting coefficient $\beta$ of the image E produced by shadow detection (for example, $\alpha=1$, $\beta=4$). In other words, the combinations of the coefficients $\alpha$ and $\beta$ are opposite to the combinations of the weighting coefficients $\alpha$ and $\beta$ shown in FIGS. 30A and 30B. It is because in the case where S/N (signal-to-noise ratio) of the output of the I/O display panel 20 is high, or depending on the kind of application, it is effective to reverse the magnitude correlation of a combination ratio with respect to brightness. In such a configuration, by multiplying a process result with lower sensitivity by a high magnification (increasing the weighting coefficients), both process results from the shadow image fingertip extraction process and the differential image fingertip extraction process are used in a balanced manner, so more stable output is able to be obtained. Moreover, in post-processing, a finger is easily discriminated at a fixed threshold value. However, even in the case where the ambient environment is dark, it is necessary to reduce noises of the output of the I/O display panel 20, and it is necessary to separately prevent the occurrence of the above-described differential edge.

As described above, in the embodiment, a switching process between the fingertip extraction processes using the synthesized images from two combinations A and B is performed on the basis of the magnitude of the predetermined parameter, and in the case where the predetermined parameter is increasing, when the parameter reaches the first switching threshold value, switching from a fingertip extraction process using a synthesized image from one of the combinations A and B to a fingertip extraction process using a synthesized image by the other combination is performed, and in the case where the parameter is decreasing, when the parameter reaches the second switching threshold value which is smaller than the first switching threshold value, a switching process from the fingertip extraction process using the synthesized image by the other combination to the fingertip extraction process using the synthesized image by the one combination is performed, so as in the case of the first embodiment, for example, even in the case where the parameter fluctuates around the first threshold value or the second threshold value, switching between the fingertip extraction processes with a high frequency is prevented. Therefore, irrespective of use conditions, an object is stably detectable.

Execution Example of Application Program

Next, referring to FIGS. 32A and 32B to 35, some execution examples of an application program by the application program execution section 11 using object position information or the like detected by the above-described fingertip extraction process will be described below.

Figure 32A:
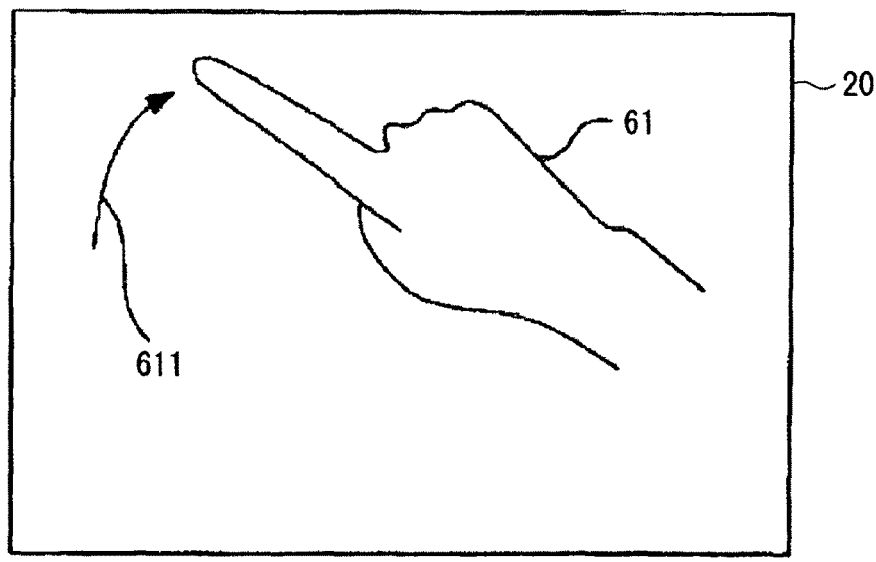
FIGS. 32A and 32B are illustrations for describing an example of an application using a result by the fingertip extraction process.

At first, an example shown in FIG. 32A is an example in which when a fingertip 61 touches a surface of the I/O display panel 20, a trail of points where the fingertip 61 touches is displayed on a screen as a drawing line 611.

Figure 32B:
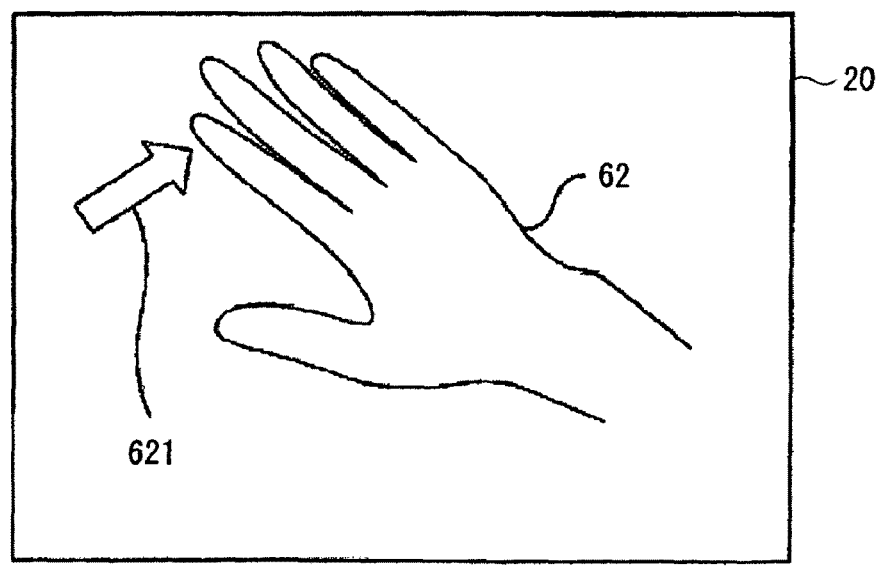

Moreover, an example shown in FIG. 32B is gesture recognition using the shape of a hand. More specifically, the shape of a hand 62 touching (or in proximity to) the I/O display panel 20 is recognized, and the shape of the recognized hand is displayed as an image, and some process is performed on the image by a movement 621 of a displayed object.

Figure 33:
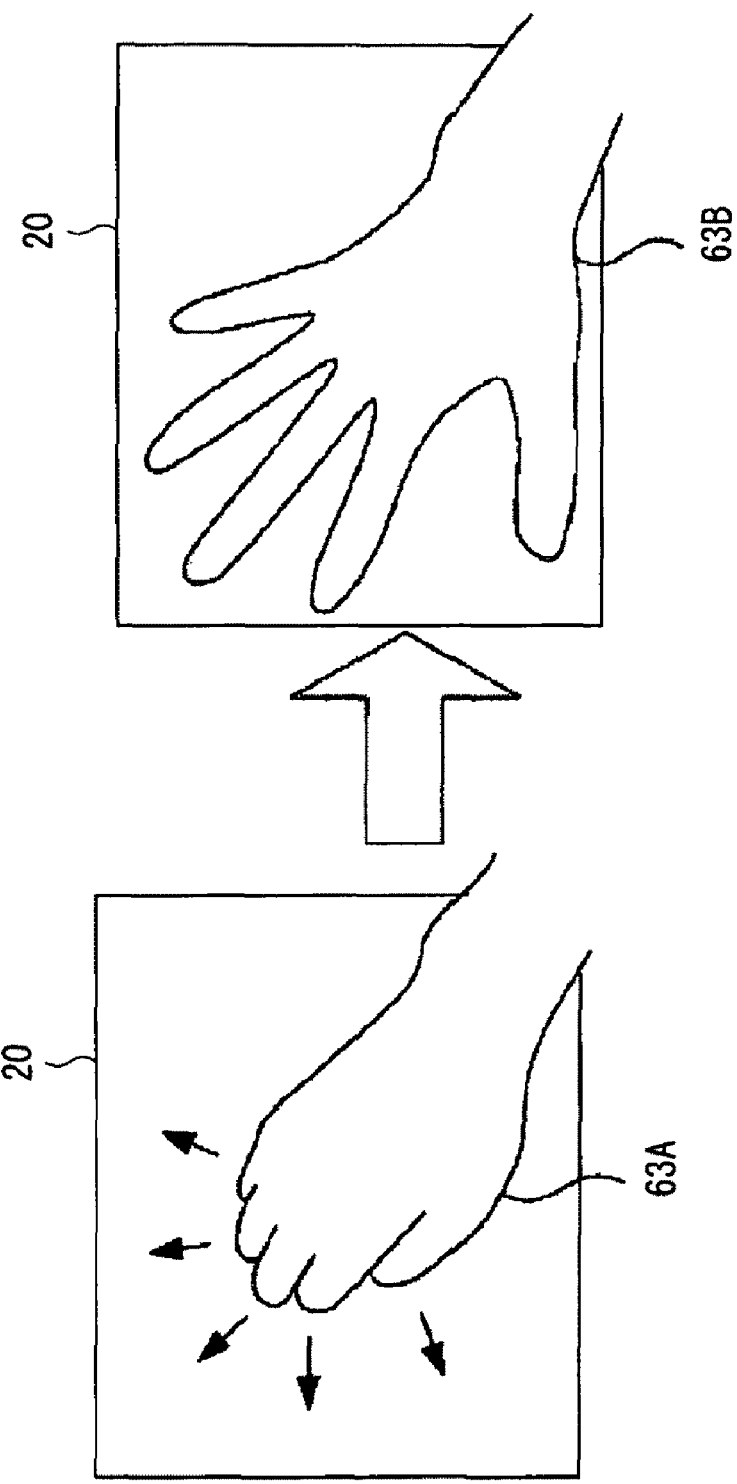
FIG. 33 is an illustration for describing an example of an application using a result by the fingertip extraction process.

Further, an example shown in FIG. 33 is that by changing from a hand 63A in a closed state to a hand 63B in an opened state, the hands touching or coming in proximity in both states are image-recognized by the I/O display panel 20 to execute a process on the basis of these image recognitions. When the process is performed on the basis of these recognitions, for example, an instruction such as zoom-in is performed. Moreover, as such an instruction is performed, for example, the I/O display panel 20 is connected to a personal computer, and an operation of switching a command on the computer or the like is inputted by these image recognitions in a more natural way.

Figure 34:
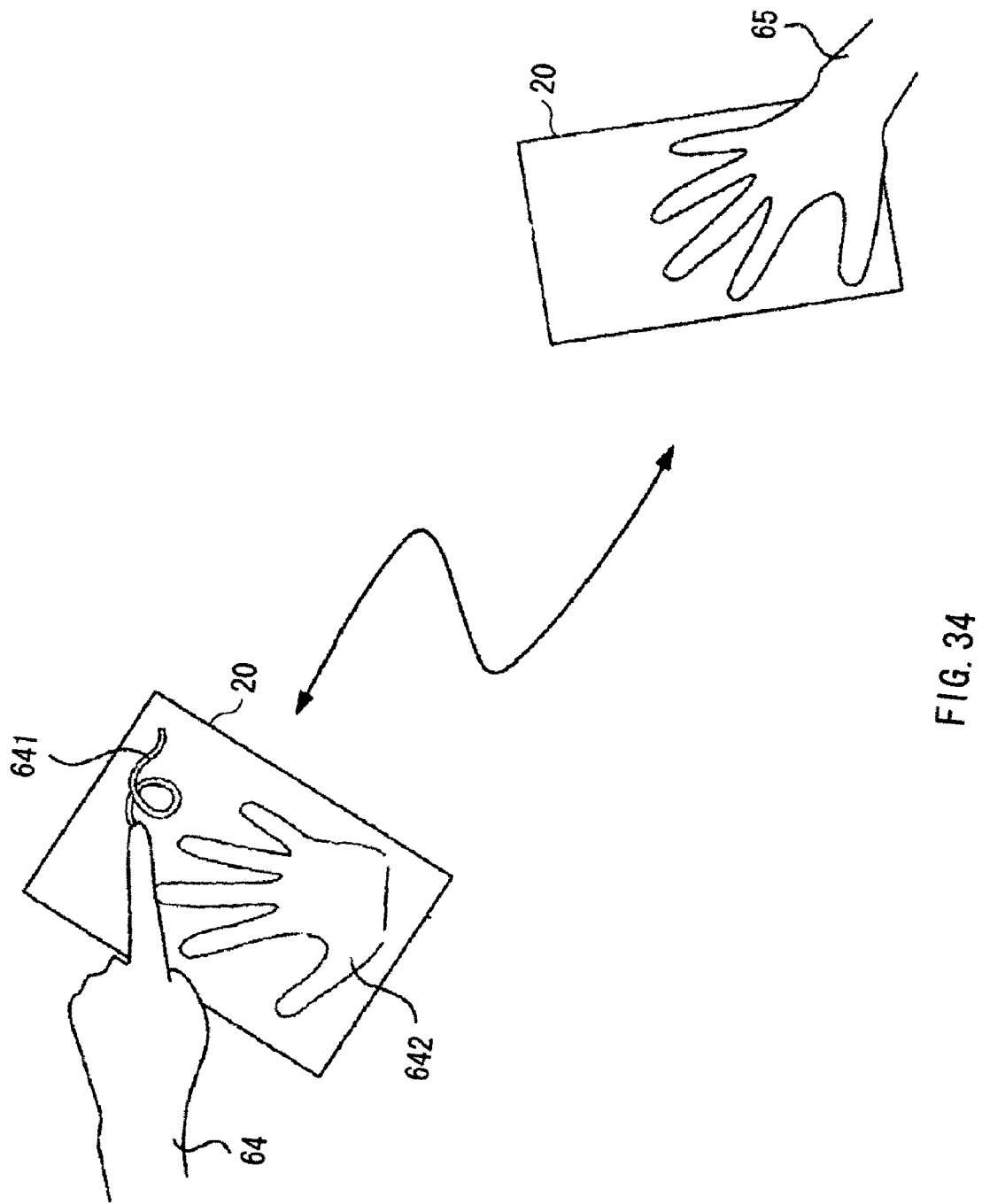
FIG. 34 is an illustration for describing an example of an application using a result by the fingertip extraction process.

Moreover, for example, as shown in FIG. 34, when a plurality of I/O display panels 20 are prepared, and the plurality of I/O display panels 20 are connected to one another by some transmission means, users operating the I/O display panels 20 may communicate with each other by transmitting and displaying an image obtained by detecting an object touching or coming in proximity to one I/O display panel 20 to and on another I/O display panel 20. In other words, as shown in FIG. 25, two I/O display panels 20 are prepared, thereby a process such as transmitting the shape of a hand 65 which is image-recognized in one panel to the other panel so that a hand shape 642 is displayed on the other panel, or transmitting and displaying a track 641 displayed by touching one panel by a hand 64 to and on the other panel is able to be performed. Thus, the I/O display panel 20 which transmits a drawing state as a moving image, and transmits a handwriting character, symbol or the like to other users may be a potential new communication tool. As such an example, it is expected that, for example, the I/O display panel 20 is applied to a display panel of a cellular phone or the like.

Figure 35:
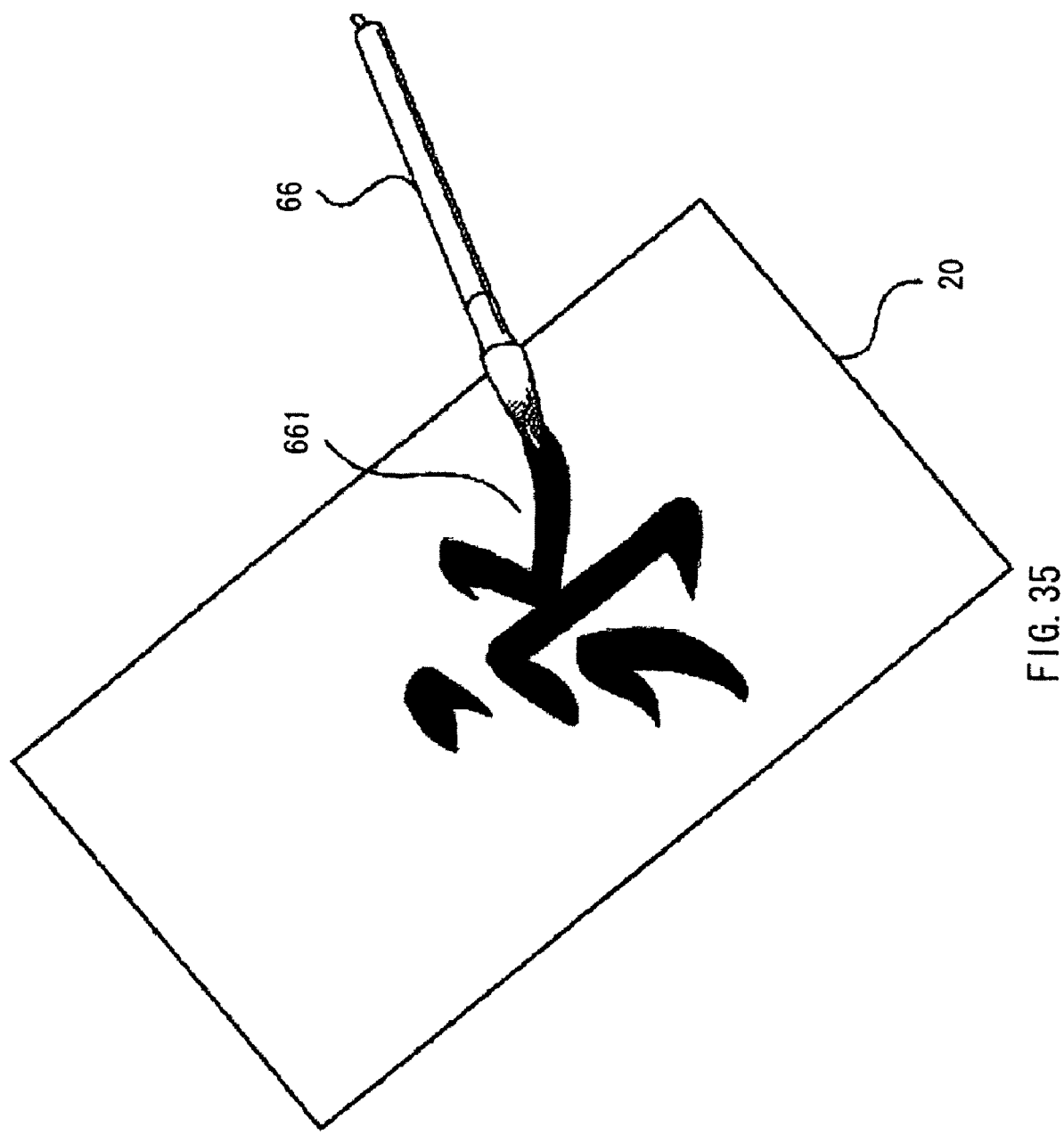
FIG. 35 is an illustration for describing an example of an application using a result by the fingertip extraction process.

Moreover, for example, as shown in FIG. 35, a brush 66 is used, and touches a surface of the I/O display panel 20 so as to draw a character, and a point where the brush 66 touches is displayed on the I/O display panel 20 as an image 661, thereby an handwriting input by a brush is possible. In this case, a fine touch by a brush can be recognized and displayed. In handwriting recognition in related art, for example, in some digitizers, the inclination of a special pen is reflected in display by detecting an electric field; however, in the example, a surface where a real brush touches is detected, thereby information input is performed with a more realistic sense.

Although the present invention is described referring to the first and second embodiments, the invention is not specifically limited to the embodiments, and may be variously modified.

For example, in the above-described embodiments, the case where the threshold values Th11, Th12, Th21, Th22, Th31 and Th32 are fixed values is described; however, for example, these threshold values may be arbitrarily adjustable.

Figure 36A:
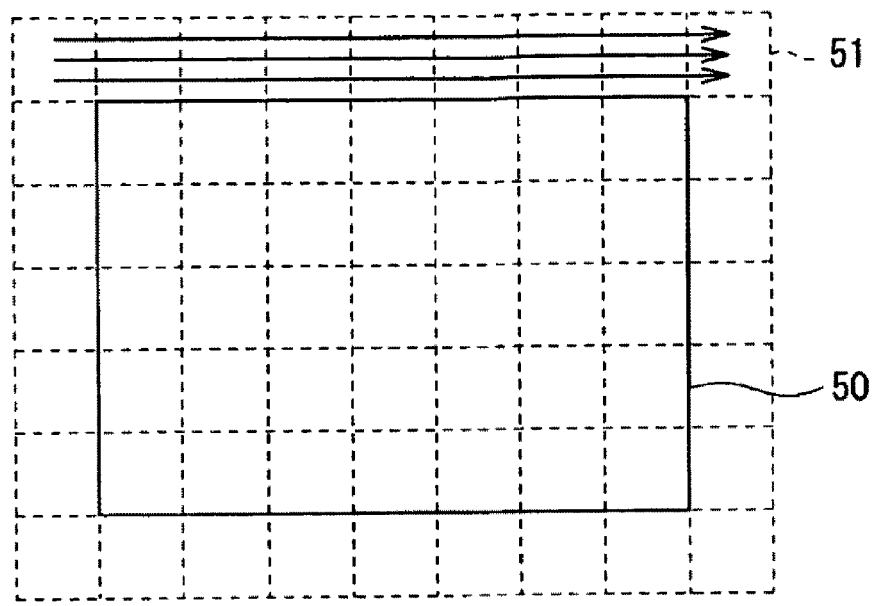
FIGS. 36A and 36B are illustrations for describing a moving average image producing process according to a modification of the invention.
Figure 36B:
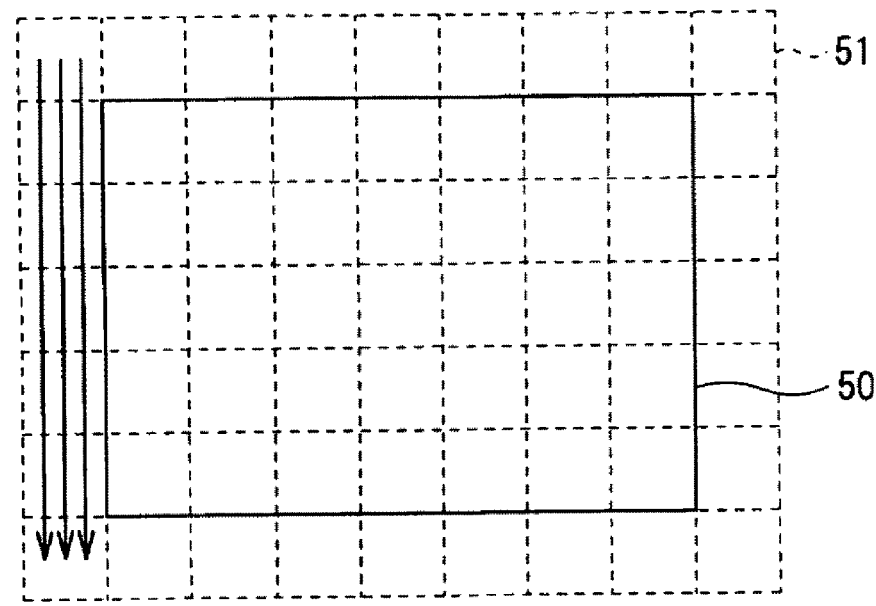
Figure 37A:
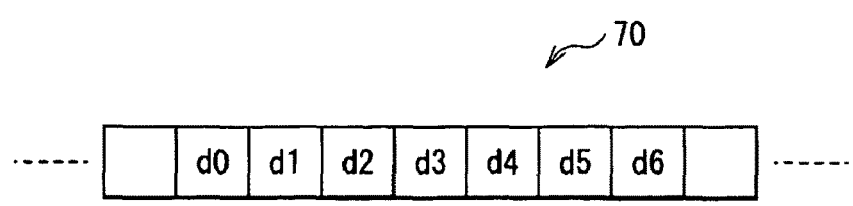
FIGS. 37A and 37B are illustrations for describing a moving average image producing process according to a modification of the invention.
Figure 37B:
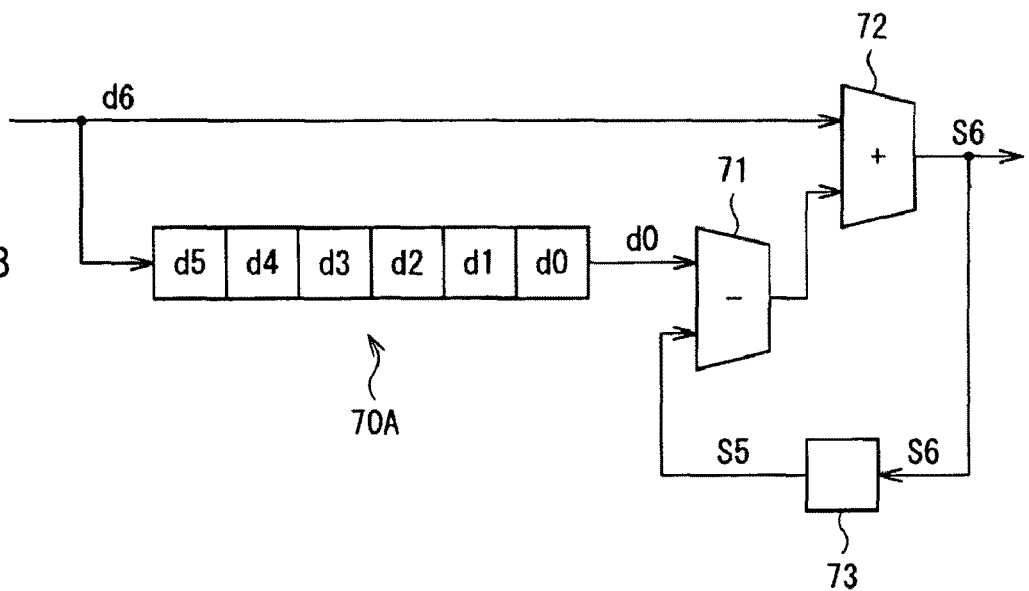

Moreover, in the moving average image producing process according to the invention, when the averaging image processing is performed, target pixels may be reduced, and arithmetic operation may be performed on the reduced target pixels so as to reduce processes. For example, as shown in FIGS. 36A and 36B, while a marked pixel is sequentially shifted along one pixel direction, averaging arithmetic processing is performed only on pixels on the one pixel direction, and after that, while a marked pixel is sequentially shifted along another pixel direction, averaging arithmetic processing may be performed only on pixels on the other pixel direction. Further, a dot addition process to a predetermined direction may be performed through the use of arithmetic circuits 70 to 73 as shown in FIGS. 37A and 37B.

Further, in the above-described embodiments, the moving average image MA is produced from the original image A, and the size of the pixel region 50 in the moving average arithmetic processing is set on the basis of the size expected as an object to be detected (a target size a), thereby in the moving average image MA, an image with a larger size than the pixel region 50, that is, an image with a higher spatial frequency than that of the pixel region 50 (in this case, a fingertip image) is removed, and an image with a lower spatial frequency than that of the pixel region 50 (in this case, the shadow image) is removed by determining a difference between the moving average image MA and the original image A, and only an image with a high spatial frequency (in this case, the fingertip image) is extracted. In other words, in the above-described embodiments, as an example of such a high-frequency pass filter and a method allowing the simplest and high-speed process, a method of determining a difference between the moving average image MA and the original image A is described. Therefore, the method of determining the difference is not limited to the methods described in the above embodiments, and both of a low-frequency pass filter process and a differential process may be performed at a time through the use of another high-frequency pass filter.

Moreover, in the above-described embodiments, the case where the backlight 15 emits display light is described; however, the backlight 15 may emit infrared light as non-visible light together with display light, and the light-receiving devices in the sensor area 21 may receive the infrared light. Further, a switching process between these two fingertip extraction processes may be performed by detecting an infrared light component of external light (environment light), and using an extraction result by one of the differential image fingertip extraction process and the shadow image fingertip extraction process on the basis of the magnitude of illuminance of the infrared light component.

Figure 38:
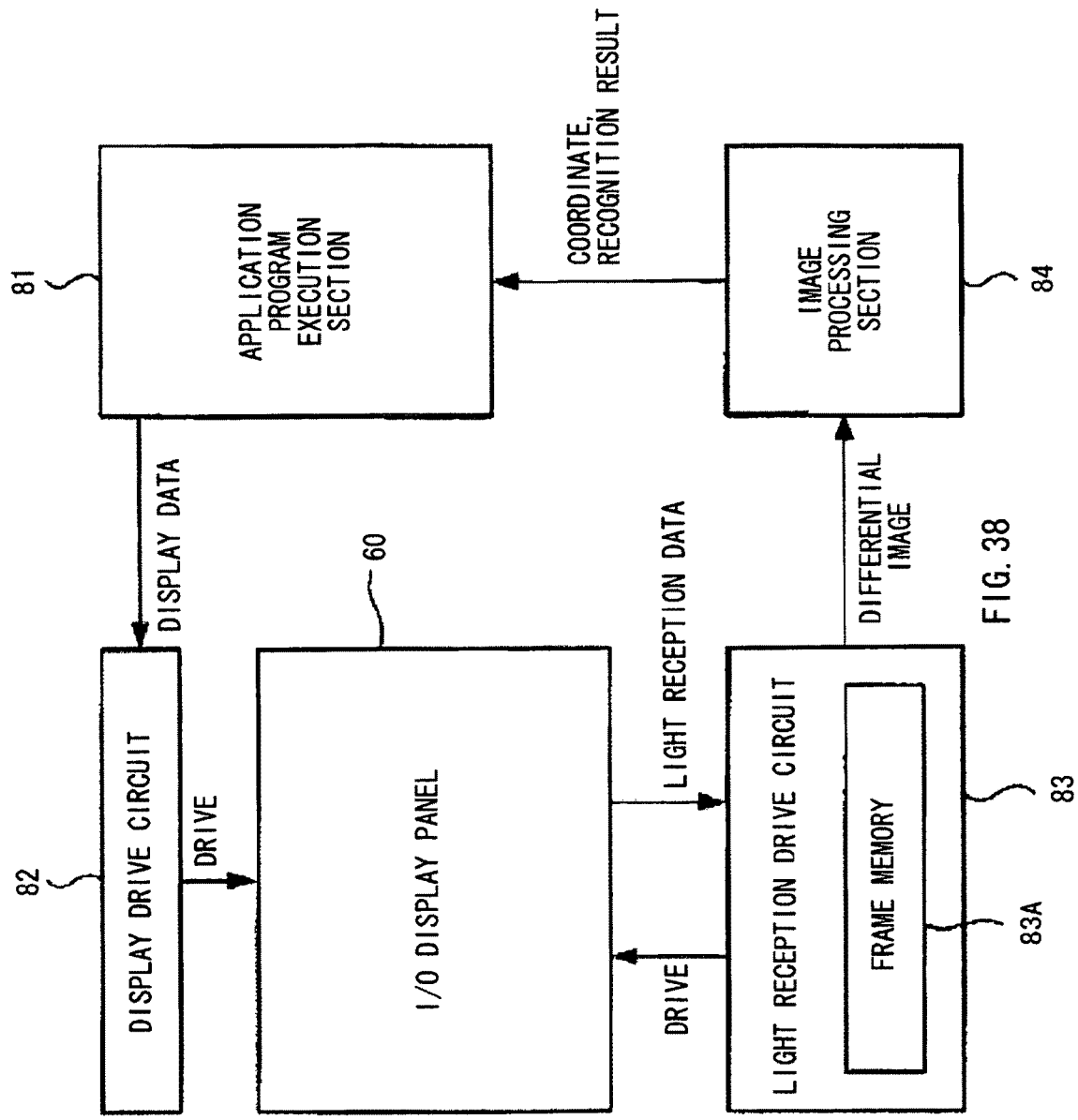
FIG. 38 is a block diagram showing the configuration of a display-and-image-pickup apparatus according to a modification of the invention.
Figure 39:
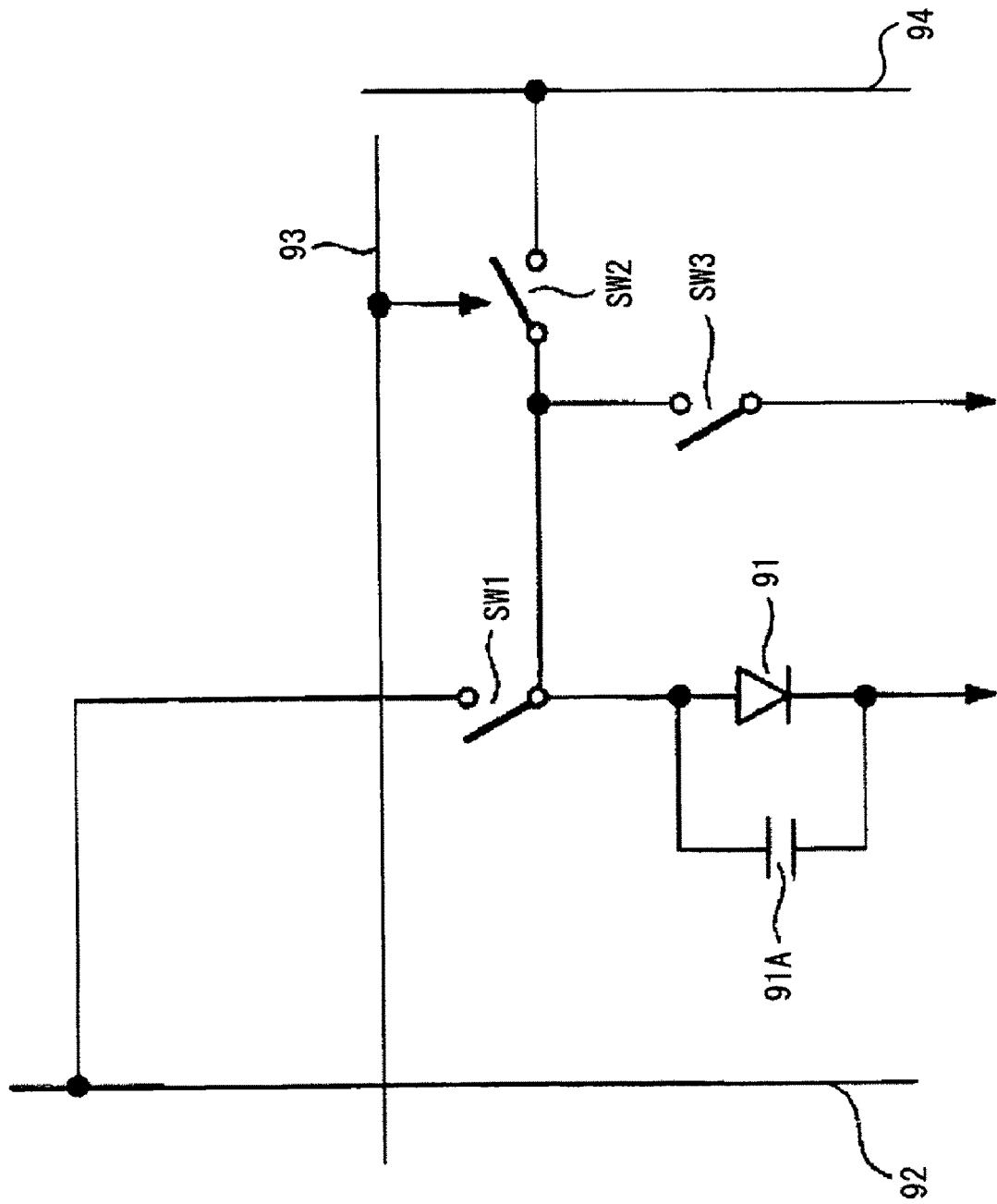
FIG. 39 is a circuit diagram showing a configuration example of each pixel in the display-and-image-pickup apparatus shown in FIG. 38.

Moreover, in the above-described embodiments, the case where in the I/O display panel 20, a display device is a liquid crystal device, and a light-receiving device is separately arranged is described; however, like a display-and-image-pickup apparatus shown in FIGS. 38 and 39, for example, like an organic EL (ElectroLuminescence) device, a light-emitting/receiving device (a display-and-image-pickup device) capable of performing a light-emitting operation and a light-receiving operation by time division may constitute an I/O display panel (an I/O display panel 80). In such a configuration, the same effects as those in the above-described embodiments may be obtained. In addition, a period in which display light is not emitted in this case is a period in which the light-emitting operation by the display-and-image-pickup device is not performed.

It should be understood by those skilled in the art that various modifications, combinations, sub-combinations and alterations may occur depending on design requirements and other factors insofar as they are within the scope of the appended claims or the equivalents thereof.

What is claimed is:

1. A display-and-image-pickup apparatus comprising:
   a display-and-image-pickup panel having an image display function and an image pickup function;
   an image producing means for producing a predetermined processed image on the basis of a picked-up image of a proximity object obtained through the use of the display-and-image-pickup panel;
   an image processing means for obtaining information about at least one of position, shape and size of the proximity object through selectively using one of two obtaining modes on the basis of at least one of the picked-up image and the processed image; and
   a switching means for performing a switching process between the two obtaining modes in the image processing means on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value.

2. The display-and-image-pickup apparatus according to claim 1, wherein
   the picked-up image is a shadow image obtained by picking up an image of a shadow of the proximity object with the display-and-image-pickup panel, and
   the processed image is a differential image obtained by performing a differential process between a display-light-utilized image and the shadow image, the display-light-utilized image being obtained by picking up an image of the proximity object with the display-and-image-pickup panel through the use of display light from the display-and-image-pickup panel.

3. The display-and-image-pickup apparatus according to claim 2, wherein
   the one of the two obtaining modes is a differential obtaining mode performed on the basis of the differential image, and the other is a shadow obtaining mode performed on the basis of the shadow image.

4. The display-and-image-pickup apparatus according to claim 3, wherein
the predetermined parameter is illuminance of environment light.

5. The display-and-image-pickup apparatus according to claim 4, wherein
the switching means detects the illuminance of the environment light through the use of a moving average image of the shadow image.

6. The display-and-image-pickup apparatus according to claim 3, wherein
the predetermined parameter is display luminance of the display-and-image-pickup panel.

7. The display-and-image-pickup apparatus according to claim 2, wherein
the image producing means has a function of producing a synthesized image from the differential image and the shadow image through the use of a plurality of combinations of weighting coefficients,
one of the two obtaining modes is a first synthesization obtaining mode performed on the basis of a synthesized image through the use of a combination of the weighting coefficient of the shadow image and the weighting coefficient of the differential image where the latter is larger than the former, and the other is a second synthesization obtaining mode performed on the basis of a synthesized image through the use of a combination of the weighting coefficient of the shadow image and the weighting coefficient of the differential image where the latter is smaller than the former.

8. The display-and-image-pickup apparatus according to claim 7, wherein
the predetermined parameter is illuminance of environment light, and
the switching means performs the switching process so that, in the case where the illuminance of the environment light is increasing, the first synthesization obtaining mode is switched to the second synthesization obtaining mode when the illuminance of the environment light reaches a first illuminance threshold value, and in the case where the illuminance of the environment light is decreasing, the second synthesization obtaining mode is switched to the first synthesization obtaining mode when the illuminance of the environment light reaches a second illuminance threshold value smaller than the first illuminance threshold value.

9. The display-and-image-pickup apparatus according to claim 7, wherein
the predetermined parameter is illuminance of environment light, and
the switching means performs the switching process so that, in the case where the illuminance of the environment light is increasing, the second synthesization obtaining mode is switched to the first synthesization obtaining mode when the illuminance of the environment light reaches a first illuminance threshold value, and in the case where the illuminance of the environment light is decreasing, the first synthesization obtaining mode is switched to the second synthesization obtaining mode when the illuminance of the environment light reaches a second illuminance threshold value smaller than the first illuminance threshold value.

10. The display-and-image-pickup apparatus according to claim 7, wherein
the predetermined parameter is illuminance of environment light, and
the switching means detects the illuminance of the environment light through the use of a moving average image of the shadow image.

11. The display-and-image-pickup apparatus according to claim 1, wherein
the first and second threshold values are arbitrarily adjustable by a user.

12. The display-and-image-pickup apparatus according to claim 1, wherein
the image processing means obtains information about at least one of the position, the shape and the size of each of a plurality of proximity objects placed on the display-and-image-pickup panel at the same time.

13. The display-and-image-pickup apparatus according to claim 1, wherein
obtained information about at least one of the position, the shape and the size of the proximity object is displayed on the display-and-image-pickup panel.

14. The display-and-image-pickup apparatus according to claim 1, wherein
the display-and-image-pickup panel includes a plurality of liquid crystal devices and a plurality of image pickup devices.

15. The display-and-image-pickup apparatus according to claim 1, wherein
the display-and-image-pickup panel includes a plurality of display-and-image-pickup devices being allowed to perform a light-emitting operation and a light-receiving operation by time division.

16. The display-and-image-pickup apparatus according to claim 15, wherein
the display-and-image-pickup devices are organic EL devices.

17. An object detection program, stored on a non-transitory computer readable medium, causing a computer to execute:
an image pickup step of obtaining a picked-up image of a proximity object through the use of a display-and-image-pickup panel having an image display function and an image pickup function;
an image producing step of producing a predetermined processed image on the basis of the picked-up image obtained in the image pickup step;
a detecting step of detecting information about at least one of position, shape and size of the proximity object through selectively using one of two obtaining modes on the basis of at least one of the picked-up image obtained in the image pickup step and the processed image obtained in the image producing step; and
a switching step of performing a switching process between the two obtaining modes used in the detecting step on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value.

18. A method of detecting an object comprising the steps of:
obtaining a picked-up image of a proximity object through the use of a display-and-image-pickup panel having an image display function and an image pickup function;
producing a predetermined processed image on the basis of the picked-up image;

detecting information about at least one of position, shape and size of the proximity object through selectively using one of two obtaining modes on the basis of at least one of the picked-up image and the processed image; and performing a switching process between the two obtaining modes on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value.

19. A display-and-image-pickup apparatus comprising:

a display-and-image-pickup panel having an image display function and an image pickup function;

an image producing section producing a predetermined processed image on the basis of a picked-up image of a proximity object obtained through the use of the display-and-image-pickup panel;

an image processing section obtaining information about at least one of position, shape and size of the proximity object through selectively using one of two obtaining modes on the basis of at least one of the picked-up image and the processed image;

a switching section performing a switching process between the two obtaining modes in the image processing section on the basis of the magnitude of a predetermined parameter so that, in the case where the parameter is increasing, one of the two obtaining modes is switched to the other obtaining mode when the parameter reaches a first threshold value, and in the case where the parameter is decreasing, the other obtaining mode is switched to the one obtaining mode when the parameter reaches a second threshold value smaller than the first threshold value.

* * * * *